(12) United States Patent
Lacey et al.

(10) Patent No.: US 11,470,074 B2
(45) Date of Patent: Oct. 11, 2022

(54) SYSTEMS AND METHODS FOR ELECTRONICALLY SHARING PRIVATE DOCUMENTS USING POINTERS

(71) Applicant: Trunomi LTD., Pembroke (BM)

(72) Inventors: Stuart H. Lacey, Paget (BM); Naresh Singhal, Mountain View, CA (US); David P. Mallon, Hamilton Parish (BM)

(73) Assignee: Trunomi Ltd., Pembroke (BM)

( * ) Notice: Subject to any disclaimer, the term of this patent is extended or adjusted under 35 U.S.C. 154(b) by 182 days.

(21) Appl. No.: 15/130,892

(22) Filed: Apr. 15, 2016

(65) Prior Publication Data

US 2016/0308855 A1  Oct. 20, 2016

Related U.S. Application Data

(60) Provisional application No. 62/148,633, filed on Apr. 16, 2015.

(51) Int. Cl.
*H04L 29/06* (2006.01)
*H04L 9/40* (2022.01)
(Continued)

(52) U.S. Cl.
CPC ....... *H04L 63/0823* (2013.01); *G06Q 50/265* (2013.01); *H04L 63/0435* (2013.01);
(Continued)

(58) Field of Classification Search
CPC ............. H04L 63/0823; H04L 63/0435; H04L 63/061; H04L 63/10; H04L 67/06; H04L 67/10; G06Q 50/265
See application file for complete search history.

(56) References Cited

U.S. PATENT DOCUMENTS

| 6,047,269 A * | 4/2000 | Biffar ................. G06Q 20/06 705/26.1 |
| 6,839,843 B1 | 1/2005 | Bacha et al. |

(Continued)

OTHER PUBLICATIONS

International Serch Report and Written Opinion, PCT/IB2016/000982, dated Sep. 30, 2016, 11 pgs.
(Continued)

*Primary Examiner* — Joseph P Hirl
*Assistant Examiner* — Chi D Nguy
(74) *Attorney, Agent, or Firm* — Morgan, Lewis & Bockius LLP

(57) ABSTRACT

A system for electronically sharing private documents using document pointers is disclosed. The system includes a processor and memory. A pointer database electronically coupled to the processor for storing a pointer to a document associated with a user and stored on a repository device of a plurality of repository devices remote from the server system, wherein the pointer comprises a unique identifier of the document and an associated location of that document on the repository device. A network communications interface electronically coupled to the processor is configured to electronically receive from a client device, an electronic authorization to share the document with a recipient third-party device of a plurality of recipient third-party devices, and, in response to the electronic request, transmit an encrypted information package including the pointer to the document to one of the client device, the repository, or the third-party device to facilitate the document sharing.

23 Claims, 13 Drawing Sheets

(51) Int. Cl.
  *G06Q 50/26* (2012.01)
  *H04L 67/06* (2022.01)
  *H04L 67/10* (2022.01)

(52) U.S. Cl.
  CPC ............ *H04L 63/061* (2013.01); *H04L 63/10* (2013.01); *H04L 67/06* (2013.01); *H04L 67/10* (2013.01)

(56) References Cited

U.S. PATENT DOCUMENTS

| | | | |
|---|---|---|---|
| 2005/0198061 A1* | 9/2005 | Robinson | H04L 67/104 |
| 2006/0010323 A1 | 1/2006 | Martin et al. | |
| 2010/0161993 A1 | 6/2010 | Mayer | |
| 2011/0107408 A1* | 5/2011 | Blot-Lefevre | G06F 21/6209 726/7 |
| 2014/0019761 A1* | 1/2014 | Shapiro | H04L 9/3247 713/176 |
| 2014/0188803 A1* | 7/2014 | James | G06F 11/1451 707/638 |
| 2014/0351335 A1* | 11/2014 | Le Huerou | H04L 65/1069 709/204 |
| 2015/0095352 A1 | 4/2015 | Lacey | |
| 2015/0121063 A1* | 4/2015 | Maller | H04L 63/0435 713/153 |
| 2015/0381716 A1* | 12/2015 | Moon | H04L 67/104 713/171 |
| 2016/0198202 A1* | 7/2016 | Van Brandenburg | H04N 21/26258 725/31 |
| 2017/0249328 A1* | 8/2017 | Liang | G06F 16/182 |

OTHER PUBLICATIONS

Lacey, International Preliminary Report on Patentability, PCT/IB2016/000982, dated Oct. 17, 2017, 7 pgs.

Lacey, Communication Pursuant to Rules 161(1) and 162, E16744848.9, dated Dec. 1, 2017, 2 pgs.

Trumoni Ltd., Communication Pursuant to Article 94(3), E16744848.9, dated Sep. 27, 2019, 3 pgs.

* cited by examiner

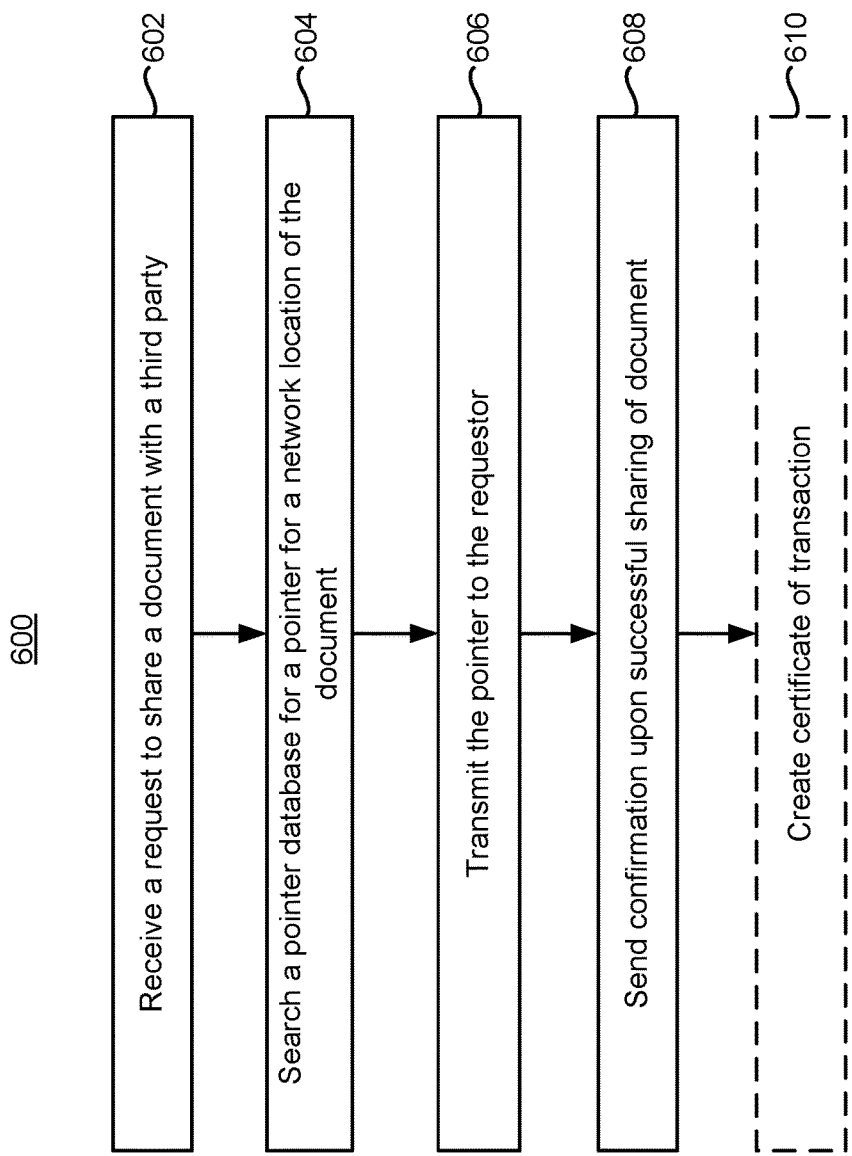

SYSTEMS AND METHODS FOR ELECTRONICALLY SHARING PRIVATE DOCUMENTS USING POINTERS

CROSS-REFERENCE

This application claims priority to U.S. Provisional Application No. 62/148,633, filed Apr. 16, 2015, which is incorporated herein by reference in its entirety.

TECHNICAL FIELD

The disclosed implementations relate generally to improvements to computer networks, and more specifically to user control of the sharing of private documents across a network.

BACKGROUND

Verifying the identity of an individual or entity is a common occurrence for many financial, business, and other transactions. For example, before an individual can open a checking account, a bank typically requires that the individual establish that they are, in fact, who they claim to be. Traditionally, this requirement is satisfied by the individual presenting a drivers' license and a recent utility bill, or other piece of official mail addressed to the individual. However, this can be cumbersome for the individual, who often has to physically present the required documents to the requestor. Also, because the individual typically must verify his or her identity to many different institutions for many different purposes, it can become a nuisance to have to repeatedly locate the particular information that is requested and provide it to the requestor. This is also less than ideal for the requestor of the documents, who may not be competent to (or may not want to) verify that the documents are legitimate.

Moreover, financial and other transactions are increasingly performed electronically and/or over long distances. This may make it even more impractical for individuals to provide original copies of documents to the requestor. Also, because the parties may not ever meet face-to-face, it places even more importance on accurate verification that the individual is, or at least, is likely to be, who he or she claims to be.

Finally, existing systems that collect user documents in a central repository for later distribution are magnets for hackers and require vigilant security. Storing and sharing documents from these systems are also fraught with privacy issues. Other issues arise with how long documents should be stored (i.e., document retention), as well as when and how documents should be destroyed.

In light of the above, it is desirable to provide a system, method, and computer readable media that addresses security, privacy and document retention and destruction issues.

SUMMARY

Accordingly, it would be advantageous to provide systems and methods that improve upon existing techniques for sharing verified identity documents of individuals or companies with others.

In accordance with some implementations, a server system for facilitating the sharing of documents includes a processor and memory storing one or more programs comprising computer instructions for execution by the processor. A pointer database electronically coupled to the processor stores a pointer to a document associated with a user and stored on a repository device of a plurality of repository devices remote from the server system. The pointer includes a unique identifier of the document and an associated location of that document on the repository device. A network communications interface electronically coupled to the processor is configured to electronically receive via a computer network, from a client device associated with the user, an electronic authorization to share the document with a recipient third-party device of a plurality of recipient third-party devices remote from the client device, and, in response to the electronic request, transmit an information package including the pointer to the document to one of the client device, the repository, or the third-party device to facilitate the sharing of the document stored on the repository device with the recipient third-party device, wherein the information package is encrypted using an encryption key.

In accordance with some implementations, a non-transitory computer readable storage medium storing one or more programs, the one or more programs comprising instructions, which when executed by a server system with one or more processors and memory storing the one or more programs, cause the server system to receive, from a client device associated with a user, an electronic authorization to share a document associated with the user with a recipient third-party device of a plurality of third-party devices remote from the server system; search a pointer database for a pointer to the document, the pointer comprising a unique identifier for the document and a location of the stored document on a repository device; and transmit an information package including the pointer to the document to one of the client device, the repository, or the third party device to facilitate the sharing of the document stored on the repository device with the recipient third-party device, wherein the information package is encrypted using an encryption key.

The disclosed systems and methods obviate many logistical difficulties for both individuals and requesting parties. The sharing of pointers to facilitate the document sharing significantly improves the security of the system, reduces storage requirement of the entire system, and requires less bandwidth to send relatively large documents around the network. In particular, because documents are shared electronically, users do not need to physically present or mail original copies of documents to a requestor. Similarly, the requestor does not need to store or maintain original copies of the documents, reducing overhead and compliance risks. Leaving the documents in one location and sharing with multiple requesting parties further alleviate the need for each document to be duplicated on multiple dispersed server and/or devices. Moreover, because the documents are subject to verification tests, requesting entities can forgo independent verification of the documents, where appropriate, and can be alerted to potentially fraudulent identity claims quickly and easily. Finally, because the documents are encrypted and stored securely, both the individual and the requestor can be assured of the privacy and security of the information.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 6 is a flow diagram illustrating a method of sharing a document, in accordance with some implementations.

DETAILED DESCRIPTION

Figure 1:
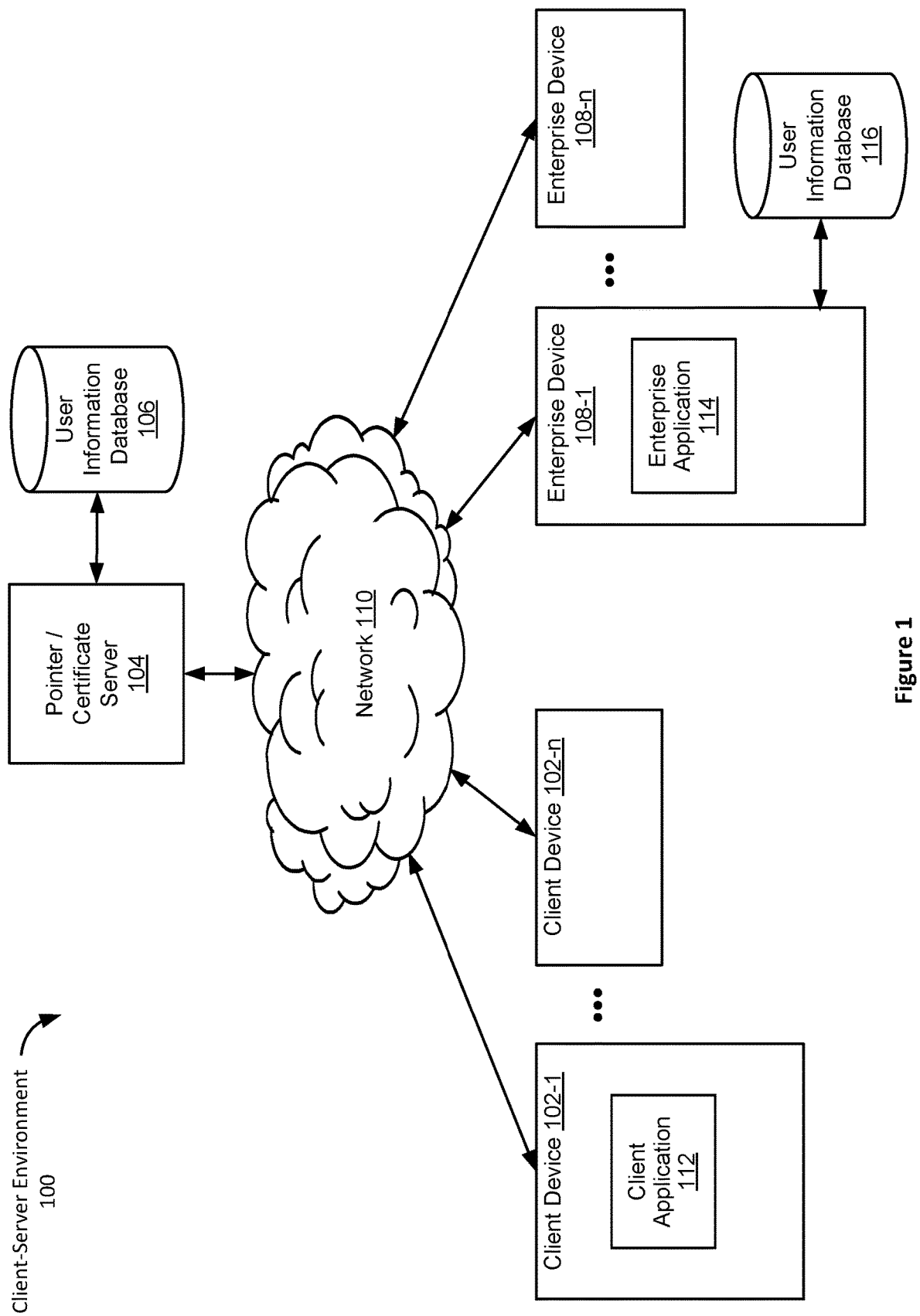
FIG. 1 is a block diagram illustrating a client-server environment, in accordance with some implementations.

Attention is now directed to the figures, and in particular to FIG. 1, which is a block diagram of a client-server environment 100, according to some implementations, in which efficient, secure, and convenient sharing of verified identity documents is possible. The client-server environment 100 includes client devices 102-1 . . . 102-n, a pointer/certificate server 104, and repository devices, such as enterprise devices 108-1 . . . 108-n, all connected through a network 110. The repository devices are, in other embodiments, any electronic devices capable of storing electronic documents on electronic media, such as application servers, file servers, home computers, portable computers, or any other similar device or devices. The network 110 includes any of a variety of networks, including wide area networks (WAN), local area networks (LAN), Personal Area Networks, metropolitan area networks, VPNs, local peer-to-peer, ad-hoc connections, wireless networks, wired networks, the Internet, or a combination of such networks.

In some implementations, the client device 102-1 is associated with an individual (or any entity that wishes to verify its identity to another party), and is used to capture and/or process documents and other information from an individual, as described herein. In some implementations, the client device 102-1 includes a client application 112 that facilitates the capture and/or processing of documents and other information (e.g., with an built-in or attached camera or scanner), and communicates with one or both of the server 104 and the enterprise device 108-1. In some implementations, the client application 112 also generates verification ratings for documents, extracts information from the documents, and encrypts the documents (as well as the verification ratings and extracted information) prior to sending the documents to an enterprise device 108-n. The client device 102-1 and the client application 112, and the functions and methods that they perform, are discussed herein. Any description(s) of the client device 102-1, or of the functions or methods performed by the client device 102-1, apply equally to any or all instances of the client devices 102-n. (Moreover, in some implementations, functions or methods described as being associated with or performed by the client device 102-1 are performed by the enterprise device 108-1, such as when a bank or other financial institution creates preliminary accounts for its customers.) Exemplary client devices include a desktop computer, a laptop computer, a tablet computer, a mobile electronic device, a mobile phone (e.g., a "smartphone"), a digital media player, or any other appropriate electronic device (or a kiosk housing any of the aforementioned devices).

In some implementations, the enterprise device 108-1 is associated with an entity that requires identity verification from individuals or other entities. The entity may be a bank, a financial institution, or any other entity that requires identity information. In some implementations, the enterprise device 108-1 includes an enterprise application 114 that facilitates the requesting and receipt of identity verification information from individuals or entities (e.g., via the pointer server 104 and other enterprise devices 108-n) and a user information database 116 for storing information and/or documents associated with a user. In some implementations, the enterprise device 108-1 communicates with one or more of the server 104, enterprise device(s) 108-n, and the client device 102-1. The pointer/certificate server 104, enterprise device 108-1, and the enterprise application 114, and the functions and methods that they perform, are discussed herein. Any description(s) of the enterprise device 108-1, or of the functions or methods performed by the enterprise device 108-1, apply equally to any or all instances of the enterprise devices 108-n. Exemplary enterprise devices include a desktop computer, a laptop computer, a tablet computer, a mobile electronic device, a server computer (or server computer system), a mobile phone, a digital media player, or any other appropriate electronic device (or a kiosk housing any of the aforementioned devices).

In some implementations, the server 104 is associated with a service provider that can communicate, via the network 110 and/or other communication means, with multiple client devices (e.g., 102-n) and multiple enterprise devices (e.g., 108-n) to provide and/or facilitate document sharing between entities. In some implementations, the server 104 includes and/or communicates with a user information database 106. As described herein, the user information database 106 stores information associated with users, including, but not limited to, pointers to documents (e.g., images or other digital representations of identification documents, utility bills, etc.), user account information, verification ratings, user scores, etc. In some implementations, any or all of the foregoing information is encrypted such that only the user with whom the information is associated (and parties authorized by the user) can access and/or view the information.

Using the client-server environment 100 illustrated in FIG. 1, identity verification documents can be quickly and efficiently shared between an individual and an institution or other entity, allowing the identity of the individual to be quickly and efficiently verified. In particular, and as described herein, the client device 102-1 and/or enterprise device 108-n is used to capture images and/or files of documents that can be used for identity verification, such as government issued photo identification cards and/or credentials (e.g., drivers' licenses, passports, etc.), utility bills, and the like. For example, in some implementations, the client device 102-1 is a smartphone with a digital camera, and an individual uses the camera to capture a photograph of a drivers' license and a utility bill. The smartphone then extracts information from the photographs of the documents, analyzes them, and generates a verification rating for the documents. In other embodiments, the enterprise device 108-n captures this information. Then, the photographs, the information extracted from the photographs, and the verification ratings are encrypted and sent to the enterprise device 108-n, which stores these items in the user information database 116 in a secure manner.

A requesting entity then requests identity verification information from an individual (e.g., using the enterprise device 108-1), and a request is sent to the individual (e.g., via the server 104). The individual then uses the client device 102-1 and/or the client application 112 to partially or fully approve (or deny) the request. If the request is approved by the individual (e.g., the individual authorizes the requesting entity to access to all or some of the requested information), the requesting entity is granted access to the authorized information via the enterprise device 108-n.

The present discussion generally refers to the entity whose identity is being verified as an individual or a "user." However, identity verification for other entities is contemplated as well, such as for companies, trusts, partnerships, businesses, families, financial institutions, etc. Accordingly, any discussion relating to an individual or a user also applies to other entities or parties whose identity and documents are to be verified and/or shared.

Figure 2:
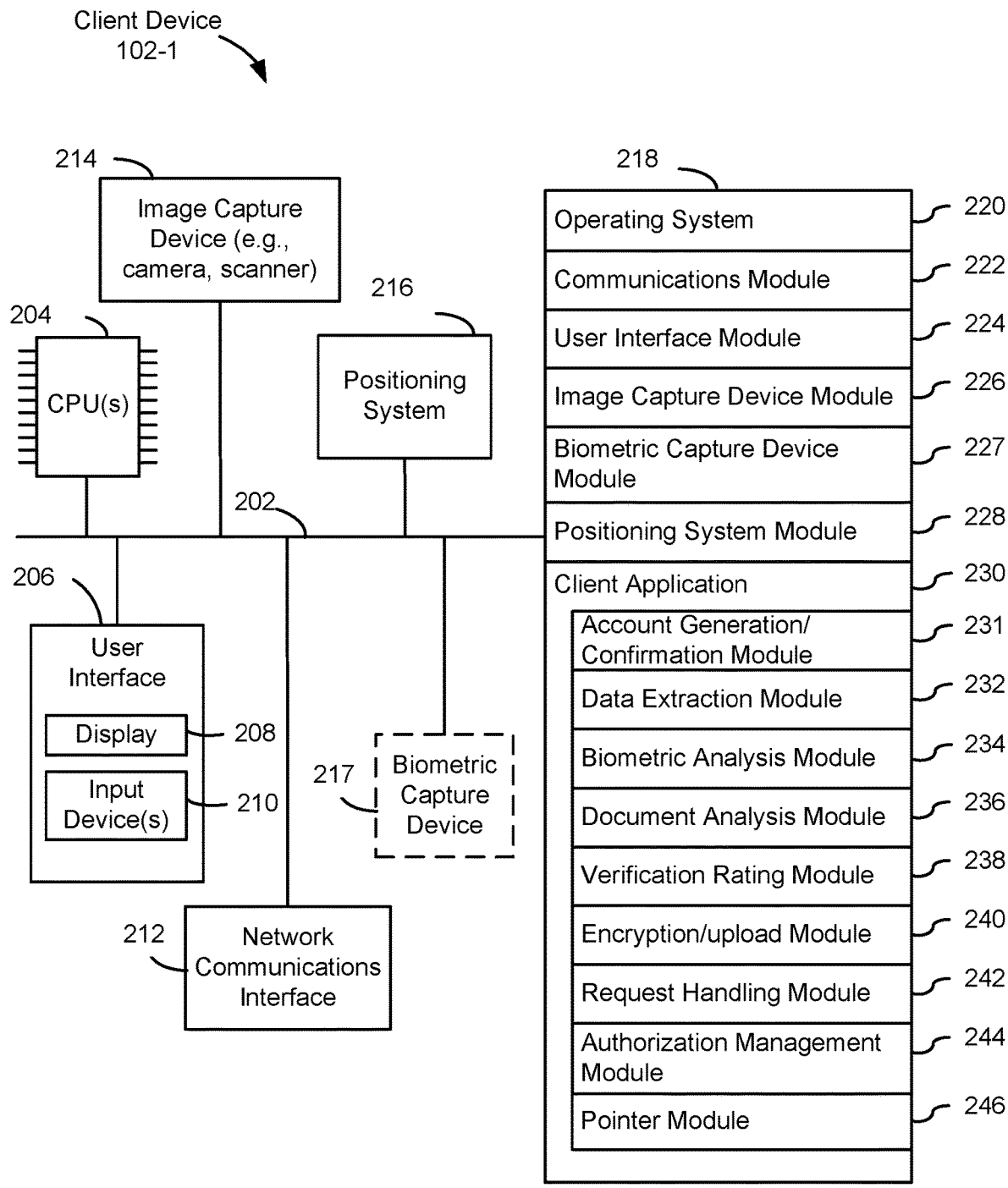
FIG. 2 is a block diagram illustrating a client computer device, in accordance with some implementations.

FIG. 2 is a block diagram illustrating a client device 102-1, in accordance with some implementations. While FIG. 2 illustrates one instance of a client device (i.e., client device 102-1), the figure and associated description applies equally to any client device (e.g., 102-1-102-n).

In some implementations, the client device 102-1 is any of: a desktop computer, a laptop computer, a tablet computer, a mobile electronic device, a mobile phone, a digital media player, or any other appropriate electronic device (or a kiosk housing any of the aforementioned devices).

The client device 102-1 typically includes one or more CPUs 204, a user interface 206, at least one network communications interface 212 (wired and/or wireless), an image capture device 214, a positioning system 216, a biometric capture device 217, memory 218, and at least one communication bus 202 for interconnecting these components. Each communication bus 202 may include circuitry (sometimes called a chipset) that interconnects and controls communications between system components. In some implementations, the user interface 206 includes a display 208 and input device(s) 210 (e.g., keyboard, mouse, touchscreen, keypads, etc.).

The image capture device 214 is any device that is capable of capturing an image of a real-world scene or object. In some implementations, the image capture device 214 is a digital camera (including any appropriate lens(es), sensor(s), and other components). In some implementations, the image capture device is a scanner (e.g., a flatbed document scanner). In some implementations, the image capture device 214 is incorporated into a common housing with the client device 102-1. For example, where the client device 102-1 is a mobile phone, the image capture device 214 is a digital camera built into the mobile phone. As another example, where the client device 102-1 is a laptop computer, the image captured device 214 is a digital camera built into the laptop computer (e.g., a "webcam"). Other possible image capture devices include 3-D scanners, 3-D cameras, range cameras, motion sensing imaging devices, ultrasonic scanners, and the like.

In some implementations, the image capture device 214 is in a different housing than the client device 102-1. In one example, the client device 102-1 is a laptop or desktop computer, and the image capture device 214 is a separate scanner or camera that is able to be coupled to the client device 102-1 to provide images to the client device (e.g., via wired connection, such as a wired network connection or a Universal Serial Bus connection, or via a wireless connection, such as WiFi, Bluetooth, or the like).

The positioning system 216 includes devices and/or components for determining the location of the client device 102-1, including but not limited to global positioning system (GPS) sensors, radio receivers (e.g., for cell-tower triangulation, WiFi-based positioning, etc.), inertial sensors, and accelerometers. In some implementations, the client device 102-1 does not include (or does not rely on) a separate positioning system 216. For example, where the client device 102-1 is connected to the Internet (e.g., via the network communications interface 212), the location of the client device 102-1 can be determined using IP address geolocation techniques. Other techniques for determining the location of the client device, including those that rely on an inbuilt or connected positioning system and those that do not, are also contemplated.

The (optional) biometric capture device 217 includes devices and/or components for capturing biometric data from a person. In some implementations, the biometric capture device 217 is a fingerprint scanner. In some implementations, it is a retinal scanner. In some implementations, it is a facial scanner. In some implementations it is a voice recognition scanner. In some implementations, the biometric capture device 217 is a multi-purpose capture device that can capture multiple types of biometric data from a user (e.g., handprints, fingerprints, facial images, etc.). In some implementations, the biometric capture device 217 is incorporated with and/or cooperates with the image capture device 214 (e.g., to capture images of a user's face for facial recognition). In some implementations, images for biometric analysis are captured using the image capture device 214, and no separate biometric capture device is necessary. In such cases, the biometric analysis may be performed using one or more software modules (e.g., the biometric analysis module 234, discussed below).

Memory 218 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 218 may optionally include one or more storage devices remotely located from the CPU(s) 204 (e.g., a network-connected storage device or service, such as a "cloud" based storage service). Memory 218, or alternately the non-volatile memory device(s) within memory 218, includes a non-transitory computer readable storage medium. In some implementations, memory 218 or the computer readable storage medium of memory 218 stores the following programs, modules and data structures, or a subset thereof:

an operating system 220 that includes procedures for handling various basic system services and for performing hardware dependent tasks;
  a communication module 222 that is used for connecting the client device 102-1 to other computers via the one or more network communication interfaces 212 (wired or wireless) and one or more communication networks, such as the Internet, other Wide Area Networks, Local Area Networks, Personal Area Networks, Metropolitan Area Networks, VPNs, local peer-to-peer and/or ad-hoc connections, and so on;
  a user interface module 224 that receives commands and/or inputs from a user via the user interface 206 (e.g., from the input device(s) 210, which may include keyboard(s), touch screen(s), microphone(s), pointing device(s), and the like), and provides user interface objects on a display (e.g., the display 208);
  an image capture device module 226 (including, for example, applications, drivers, etc.) that works in conjunction with the image capture device 214 to capture images, such as images or scans of physical documents, faces, real-world scenes, etc.;
  a biometric capture device module 227 that works in conjunction with the biometric capture device 217

(and/or the image capture device 214) for capturing biometric data of a user, including data relating to any appropriate physical characteristic of a user, such as fingerprints, eyes, retinas, facial features, voiceprints, handprints, etc.;

a positioning system module 228 that, in conjunction with the positioning system 216, determines a current location (e.g., latitude and longitude, street address, city, state, municipality, etc.) of the client device 102-1; and one or more client application module(s) 230 for enabling the client device 102-1 to perform the methods and/or techniques described herein, the client application module(s) 230 including but not limited to:

- an account generation/confirmation module 231 for generating an account with a service provider, including receiving information about a user of the client device 102-1 (e.g., name, address, social security number, password, account recovery questions/answers, biometric data, login credentials, etc.), providing this information to a remote device (e.g., the server 104) in order to create a unique user account, and interacting with the remote device to establish the user's account; the account generation/confirmation module 231 also facilitates user confirmation of account information that was provided to a remote device (e.g., the server 104) by another entity (e.g., a bank), as described herein;

- a data extraction module 232 for extracting information from documents obtained by the client device 102-1, including extracting computer-readable text from documents, using optical character recognition to recognize and extract non-computer readable text from documents, as well as locating and extracting photographs, images, holograms, laser perforations, signatures, bar codes, Quick Response (QR) codes, etc., and the like;

- a biometric analysis module 234 for analyzing biometric data, including determining whether sample biometric data matches reference biometric data (e.g., for user authentication purposes), determining whether a photograph of a user extracted from a document matches a captured photograph of the user (e.g., a photograph captured by the image capture device 214), determining whether a voice sample matches a prior approved voiceprint of the user etc.;

- a document analysis module 236 for analyzing documents (and/or information, photographs, or other content extracted from documents), for example, to determine whether and/or to what degree information extracted from the document matches other information associated with the user (such as the user's name, date of birth, address, etc.), the quality of content extracted from the document (e.g., holograms, laser perforations, etc.), and the like;

- a verification rating module 238 for generating verification ratings for documents;

- an encryption/upload module 240 for encrypting documents, biometric data, verification ratings, extracted data, and the like, and uploading such information (either encrypted or unencrypted) to a remote device (such as the server 104);

- a request handling module 242 for receiving requests for information (e.g., from the server 104, an enterprise device 108-n, and/or another client device 102-n), providing prompts to a user of the client device 102-1 (e.g., via the user interface 206), receiving partial or full authorizations or denials of the requests from the user, and responding to the requests with appropriate responses (e.g., by communicating with the server 104, an enterprise device 108-n, and/or another client device 102-n);

- an authorization management module 244 for enabling a user to view, manage, grant, change, and/or modify authorizations, including revoking previously granted authorizations; and

- a pointer module 246 for receiving pointers to documents (from, e.g., the server 104), accessing or downloading document(s) associated with the pointer(s), and transmitting the document(s) to enterprise devices 108-n.

In some implementations, the client device 102-1 includes a subset of the components and modules shown in FIG. 2. Moreover, in some implementations, the client device 102-1 includes additional components and/or modules not shown in FIG. 2.

Figure 3:
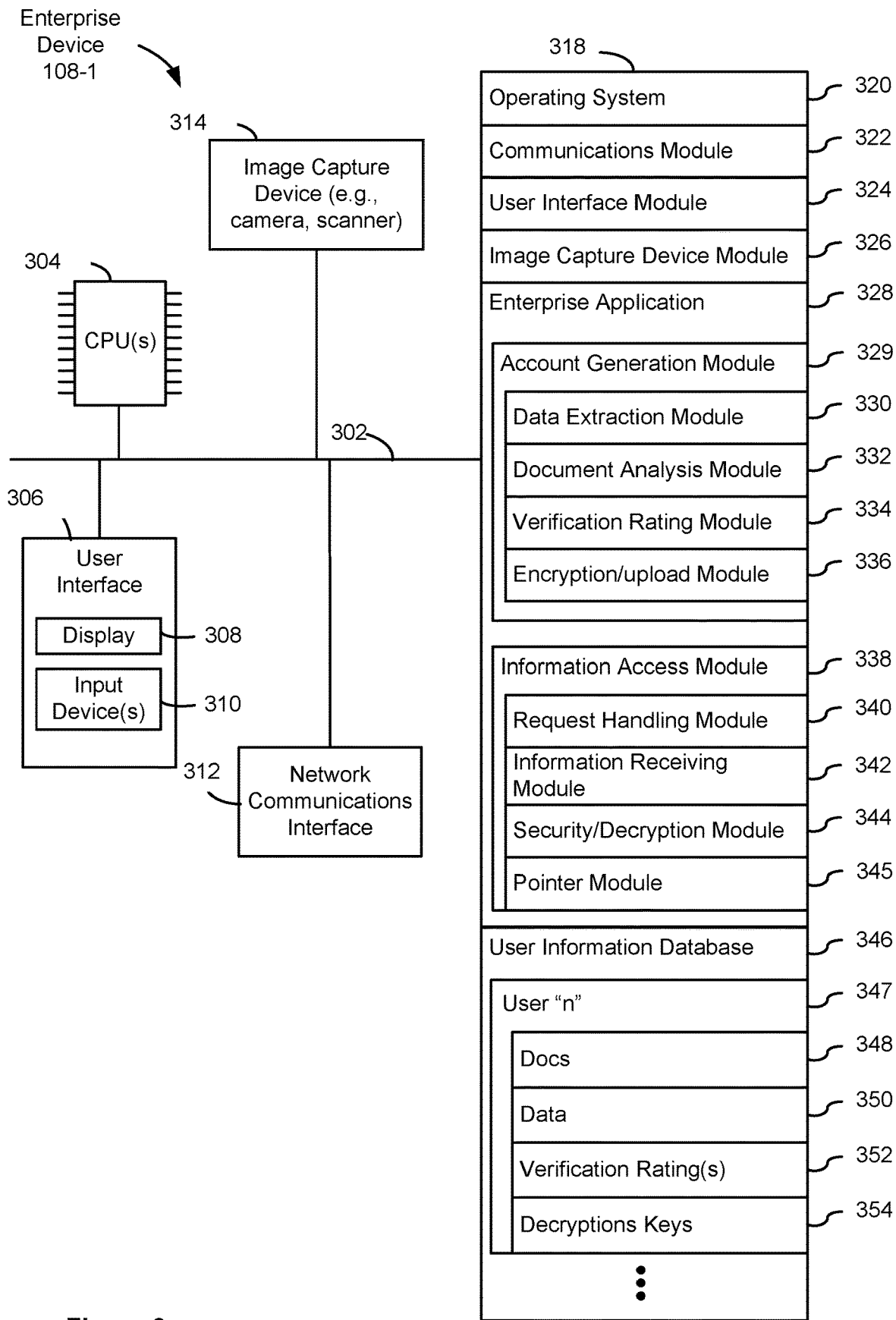
FIG. 3 is a block diagram illustrating an enterprise computer device, in accordance with some implementations.

FIG. 3 is a block diagram illustrating an enterprise device 108-1, in accordance with some implementations. While FIG. 3 illustrates one instance of an enterprise device (i.e., enterprise device 108-1), the figure and associated description applies equally to any enterprise device (e.g., 108-1-108-n).

In some implementations, the enterprise device 108-1 is any of: a desktop computer, a laptop computer, a tablet computer, a server computer (or server system), a mobile electronic device, a mobile phone, a digital media player, or any other appropriate electronic device (or a kiosk housing any of the aforementioned devices).

The enterprise device 108-1 typically includes one or more CPUs 304, a user interface 306, at least one network communications interface 312 (wired and/or wireless), an image capture device 314, memory 318, and at least one communication bus 302 for interconnecting these components. Each communication bus 302 may include circuitry (sometimes called a chipset) that interconnects and controls communications between system components. In some implementations, the user interface 306 includes a display 308 and input device(s) 310 (e.g., keyboard, mouse, touchscreen, keypads, etc.).

The image capture device 314 is any device that is capable of capturing an image of a real-world scene or object. In some implementations, the image capture device 314 is a digital camera (including any appropriate lens(es), sensor(s), or other components). In some implementations, the image capture device is a scanner (e.g., a flatbed scanner). In some implementations, the image capture device 314 is incorporated into a common housing with the enterprise device 108-1.

In some implementations, the image capture device 314 is in a different housing than the enterprise device 108-1. In one example, the enterprise device 108-1 is a laptop or desktop computer, and the image capture device 314 is a separate scanner or camera that is able to be coupled to the enterprise device 108-1 to provide images to the enterprise device (e.g., via wired connection, such as a wired network connection or a Universal Serial Bus connection, or via a wireless connection, such as WiFi, Bluetooth, or the like).

Memory 318 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 318 may optionally include one or more storage devices remotely located from the CPU(s) 304. Memory 318, or alternately the non-volatile memory device(s) within memory 318, includes a non-transitory computer readable storage medium. In some implementations, memory 318 or the computer readable storage medium of memory 318 stores the following programs, modules and data structures, or a subset thereof:

- an operating system 320 that includes procedures for handling various basic system services and for performing hardware dependent tasks;
- a communication module 322 that is used for connecting the enterprise device 108-1 to other computers via the one or more network interfaces 312 (wired or wireless) and one or more communication networks, such as the Internet, other Wide Area Networks, Local Area Networks, Personal Area Networks, Metropolitan Area Networks, VPNs, local peer-to-peer and/or ad-hoc connections, and so on;
- a user interface module 324 that receives commands and/or inputs from a user via the user interface 306 (e.g., from the input device(s) 310, which may include keyboard(s), touch screen(s), microphone(s), pointing device(s), and the like), and provides user interface objects on a display (e.g., the display 308);
- an image capture device module 326 (including, for example, applications, drivers, etc.) that works in conjunction with the image capture device 314 to capture images, such as images or scans of physical documents, faces, real-world scenes, etc.
- one or more enterprise application module(s) 328 for enabling the enterprise device 108-1 to perform the methods and/or techniques described herein, the enterprise application module(s) 328 including but not limited to:
  - one or more account generation module(s) 329 for generating accounts with a service provider for one or more users based on information already in possession of the entity operating the enterprise device 108-1 (e.g., information and documents that a user has already shared with an institution), the account generation module(s) 329 including but not limited to:
    - a data extraction module 330 for extracting information from documents obtained by the enterprise device 108-1, including extracting computer-readable text from documents, using optical character recognition to recognize and extract non-computer readable text from documents, as well as locating and extracting photographs, images, signatures, holograms, laser perforations, bar codes, Quick Response (QR) codes, etc., and the like;
    - a document analysis module 332 for analyzing documents (and/or information, photographs, or other content extracted from documents), for example, to determine whether and/or to what degree information extracted from the document matches other information associated with the user (such as the user's name, date of birth, address, etc.), the quality of content extracted from the document (e.g., holograms, laser perforations, etc.), and the like;
    - a verification rating module 334 for generating verification ratings for documents; and
    - an encryption/upload module 336 for encrypting documents, biometric data, verification ratings, extracted data, user information (e.g., name, address, social security number, etc.) and the like,
and uploading such information (either encrypted or unencrypted) to a remote device (such as the server 104); and
  - one or more information access module(s) 338 for handling requests for user information and handling information received pursuant to those requests, the information access module(s) 338 including but not limited to:
    - a request handling module 340 for receiving requests from an operator of the enterprise device 108-1 (and/or automatically generated requests) for user information, and for communicating the requests for user information to remote devices (e.g., such as the server 104 and/or a client device 102-$n$);
    - an information receiving module 342 for receiving information associated with a user (e.g., from the server 104), including but not limited to documents, data extracted from documents, verification ratings, etc., and for receiving decryption keys (e.g., from the server 104 and/or a client device 102-$n$);
    - a security/decryption module 344 for determining access rights to information associated with a user and for decrypting information associated with a user; and
    - a pointer module 345 for receiving pointers to documents (from, e.g., the server 104 and/or a client device 102-$n$), accessing or downloading document(s) associated with the pointer(s), and transmitting the document(s) to the client device 102-$n$) and/or other enterprise devices 018-$n$; and
- a user information database 346 for storing, for each user 347 (identified by a unique user identifier), user information (e.g., received from the other enterprise devices 108-$n$ or the client 102-$n$) server 104), including but not limited to one or more user documents, data extracted from documents, verification ratings, and/or encryption or decryption keys (such as public or private keys), etc. Each user 347 may have associated documents 348, data 350, verification rating(s) 352, and decryption keys 354.

In some implementations, the enterprise device 108-1 includes a subset of the components and modules shown in FIG. 3. Moreover, in some implementations, the enterprise device 108-1 includes additional components and/or modules not shown in FIG. 3.

Figure 4:
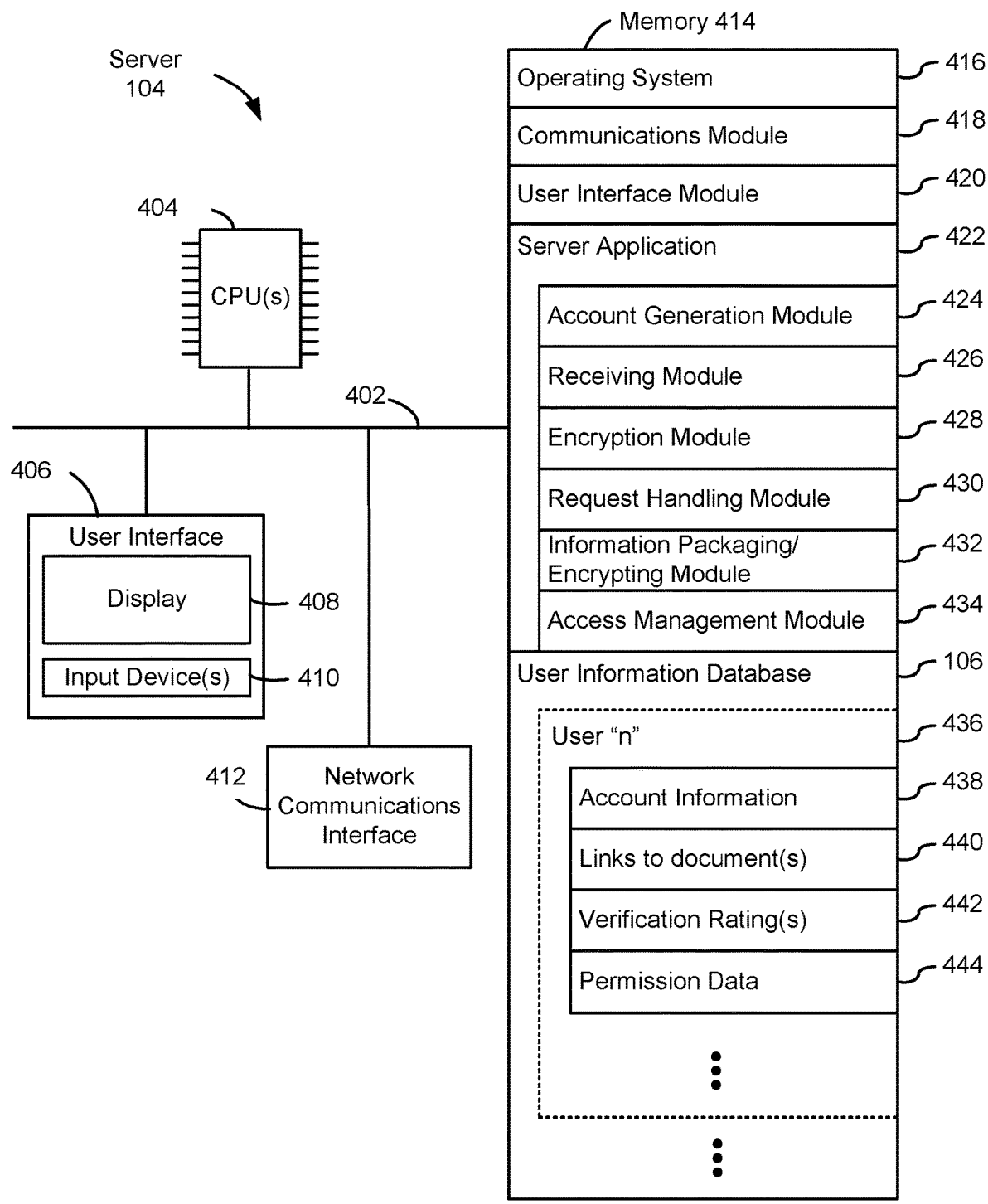
FIG. 4 is a block diagram illustrating a server computer device, in accordance with some implementations.

FIG. 4 is a block diagram illustrating a server 104, in accordance with some implementations. In some implementations, the server 104 is any of: a desktop computer, a laptop computer, a tablet computer, a server computer (or server system), a mobile electronic device, a mobile phone, a digital media player, or any other appropriate electronic device (or a kiosk housing any of the aforementioned devices). In some embodiments, the server 104 is a pointer server and a certification server; in other embodiments, each of the pointer server and certification server are implementing using more than one server 104.

The server 104 typically includes one or more CPUs 404, a user interface 406, at least one network communications interface 412 (wired and/or wireless), memory 414, and at least one communication bus 402 for interconnecting these components. Each communication bus 402 may include circuitry (sometimes called a chipset) that interconnects and controls communications between system components. In some implementations, the user interface 406 includes a display 408 and input device(s) 410 (e.g., keyboard, mouse, touchscreen, keypads, etc.).

Memory 414 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 414 may optionally include one or more storage devices remotely located from the CPU(s) 404. Memory 414, or alternately the non-volatile memory device(s) within memory 414, includes a non-transitory computer readable storage medium. In some implementations, memory 414 or the computer readable storage medium of memory 414 stores the following programs, modules and data structures, or a subset thereof:

- an operating system 416 that includes procedures for handling various basic system services and for performing hardware dependent tasks;
- a communication module 418 that is used for connecting the server 104 to other computers via the one or more network interfaces 412 (wired or wireless) and one or more communication networks, such as the Internet, other Wide Area Networks, Local Area Networks, Personal Area Networks, Metropolitan Area Networks, VPNs, local peer-to-peer and/or ad-hoc connections, and so on;
- a user interface module 420 that receives commands and/or inputs from a user via the user interface 406 (e.g., from the input device(s) 410, which may include keyboard(s), touch screen(s), microphone(s), pointing device(s), and the like), and provides user interface objects on a display (e.g., the display 408);
- one or more server application module(s) 422 for enabling the server 104 to perform the methods and/or techniques described herein, the server application module(s) 422 including but not limited to:
  - an account generation module 424 for generating accounts for users based on information provided (and/or verified) by the users or by other entities, and storing the accounts (and associated information) in the user account database 106;
  - a receiving module 426 for receiving information from remote devices (e.g., client devices 102-n, enterprise devices 108-n), including but not limited to: pointers to documents, verification ratings, account information (e.g., name, address, social security number, password, account recovery questions/answers, biometric data, login credentials, etc.), etc.;
  - an optional encryption module 428 for encrypting user information (including but not limited to pointers to documents, verification ratings, account information) for secure storage in the user information database 106, if the user information was not encrypted before it was received by the server 104;
  - a request handling module 430 for receiving and processing requests for information associated with respective users (e.g., from an enterprise device 108-n), sending authorization requests to the respective users (e.g., to a client device 102-n), and receiving authorizations from the respective users to allow access to pointers to the requested information (or a subset or superset of the pointers to the requested information);
  - an information packaging/encrypting module 432 for gathering, packaging, and encrypting user information (including but not limited to pointers to documents, verification ratings, and account information) to be sent to or otherwise accessed by a requestor (e.g., an enterprise device 108-n), and for sending the information to the requestor;
  - an access management module 434 for determining whether to allow requesting entities to access user information (e.g., based on permissions granted and/or denied by the respective users, time limits imposed by users and/or regulatory agencies, or any other appropriate permissions, limits, criteria, etc.); and
- a user information database 106 that includes information associated with a plurality of users.

FIG. 4 further illustrates a portion of the user information database 106 relating to a user account 436 for an exemplary user "n." In some embodiments, each user is assigned a unique user identifier. The user account 436 includes but is not limited to:

- account information 438 associated with the user (e.g., name, address, social security number, password, account recovery questions/answers, biometric data, login credentials, etc.);
- pointers or links to document(s) 440 associated with the user, including pointers to any appropriate documents, files, containers, etc., as well as archived sets of the above information and/or pointers. In some embodiments, the pointers include network locations and document identifiers (e.g., IP address and unique document identifier). In some embodiments, the unique document identifiers for each user are tied to that respective user's unique identifier,
- optional verification rating(s) 442, including verification ratings for all or a subset of the document(s) 440, composite verification ratings (e.g., verification ratings based on a plurality of tests), a user score, and the like; and
- permission data 444, including active and historical permissions granted by a user for requesting or authorized entities.

In some implementations, any or all of the user information in the user information databases 106, 346 is encrypted. Moreover, in some implementations, the service provider does not possess decryption keys for the user information. Accordingly, the service provider and/or the server 104 is not able to decrypt, view, read, or modify user information.

In some implementations, the server 104 includes a subset of the components and modules shown in FIG. 4. Moreover, in some implementations, the server 104 includes additional components and/or modules not shown in FIG. 4.

FIGS. 5A-5D are flow diagrams illustrating a method of verifying a user's identity, and FIGS. 5E-5H are flow diagrams illustrating methods for sharing verified identity documents, in accordance with some implementations. Each of the operations shown in FIGS. 5A-5H may correspond to instructions stored in a computer memory or computer readable storage medium. In some implementations, the steps are performed at an electronic device with one or more processors (or cores) and memory storing one or more programs for execution by the one or more processors (or cores). For example, in some implementations, the steps are performed at any one (or any combination) of the client device 102-1, the server 104, and the enterprise device 108-1. Moreover, the individual steps of the method may be distributed among the multiple electronic devices in any appropriate manner.

Any or all of the communications between devices described with respect to FIGS. 5A-5H are, in some implementations, secured and/or encrypted using any appropriate security and/or encryption techniques, including but not limited to Hypertext Transport Protocol Secure (HTTPS), Secure Sockets Layer (SSL), Transport Layer Security (TLS), Secure Shell (SSH), Internet Protocol Security (IPSec), public key encryption, and the like (including any appropriate yet to be developed security and/or encryption method).

An account is created with a service provider (502) (e.g., with the account generation/confirmation module 231). In some implementations, as part of creating the account (i.e., account enrollment/registration), a user provides to the client device 102-1 identity information, such as a name, gender, date of birth, address, social security number, residency, etc. In some implementations, the user provides login information, such as a username, password, and identity verification questions/responses (e.g., mother's maiden name, father's middle name, city of birth, etc.) In some implementations, the user provides other information as well, such as: a signature (e.g., a photograph/image of a signature, or a signature input directly into the client device 102-1, such as with a touch-sensitive screen and a stylus), a photograph, a username, a fingerprint biometric, a voiceprint biometric, a facial biometric, a zip code, and an account number.

The client device 102-1 communicates with the server 104 to register the user account, which includes the server 104 receiving and/or storing account information and/or identity information provided by the user (501) (e.g., with the account generation module 424).

The client device 102-1 obtains a document (504). Documents obtained by the client device 102-1 from a user are provided to requesting entities to help verify the user's identity. Exemplary documents include drivers' licenses, national identity cards, birth certificates, passports, social security cards, marriage certificates, utility bills, government issued photo identification cards, and the like. In the present discussion, documents are any appropriate type of digital file, including computer-readable, text-based files (e.g., word processing files, spreadsheet files, computer-generated bills, etc.), or images of physical documents (e.g., scans, digital photographs, etc.), either of which can be stored as or represented in any appropriate file type, file format, etc. (e.g., PDF files, JPEG files, GIF files, TIFF files, DOC files, etc.). Moreover, where the term "document" is used, the corresponding discussion may relate to a computer-readable version of a document, a physical version of a document, or both, depending on the context of the discussion. One of ordinary skill in the art will recognize where the discussion relates to computer-readable versions of a document and where the discussion relates to physical versions of a document.

In some implementations, the document is obtained by capturing a digital image of a physical document (e.g., with the image capture device 214 and/or the image capture device module 226). For example, where the client device 102-1 is a mobile phone with a built-in camera, the user takes a snapshot of a document using the camera. As another example, where the client device 102-1 is a laptop or desktop computer connected to a flatbed scanner, the user obtains a scan of the document using the scanner.

In some implementations, the document is obtained by retrieving it from the memory of an electronic device. For example, documents may be stored as a digital file in memory associated with and/or otherwise available to the client device 102-1. Accordingly, a user can point the client application 230 to a particular document by navigating to the file via a file browser, or directly entering a memory location (e.g., file path) of the file. The client device 102-1 then obtains the document from the specified location.

The client device 102-1 extracts data from the document (506) (e.g., with the data extraction module 232). In some implementations, extracted data includes identity information (e.g., name, address, phone number, social security number, etc.).

In some implementations, extracted data includes text data. Text data is extracted either directly from documents having computer-readable text, or extracted after performing optical character recognition on an image of a document (or both). In some implementations, extracted data includes biometric data, for example, from a photograph contained in the document. Biometric data is extracted using facial or other biometric recognition/extraction techniques. Other data may be extracted as well, including images of a signature, images of the user, other images, holograms, laser perforations, bar codes, QR codes, etc.

The client device 102 then determines that the identity information extracted from the document substantially matches the identity information associated with the user's account (508) (e.g., with the document analysis module 236). For example, the extracted identity information (e.g., the name extracted from a drivers' license) is compared to the user's account (e.g., the name that the user supplied when creating the account) to confirm that the document is associated with the account holder (i.e., the information on the two documents matches or substantially matches). Thus, if a user attempts to upload someone else's drivers' license, the client device 102-1 recognizes that the document is not associated with the user, and can reject the document, reduce or adjust a verification rating for that document, flag the document, request corroborating or additional information, or take other remedial actions.

In some implementations, the client device 102-1 performs one or more additional tests of the document (e.g., with the document analysis module 236). For example, in some implementations, the client device 102-1 determines whether a dated document (e.g., a utility bill or any other document having an issue date, mailing date, expiration date, due date, etc.) was issued within a predetermined recency window with respect to the current date (e.g., 30, 60, or 90 days, or any other appropriate window). As another example, in some implementations, the client device 102-1 identifies, from the data extracted from the document, an expiration date of the document, and determines whether the expiration date of the document is after a current date (i.e., the document has not expired). In these examples, the current date may be determined by referencing a system date of the client device 102-1, or calling out to a remote device or service (e.g., the server 104, a telecommunications service) and receiving a current date. Such tests can help ensure that a user does use old or outdated documents, which may be an indicator that the information contained thereon is not accurate. Other tests may also be performed.

In some implementations, the client device 102-1 determines whether a system date of the client device substantially matches a reference date provided by a remote device. This test can help identify attempts to tamper with the system date of the client device 102-1, which may be attempted by users to enable them to upload a document that is out-of-date or expired. If the system date of the client device does not substantially match the reference date, remedial measures can be taken. For example, the client device 102-1 and/or the server 104 will prevent the user from uploading the document, adjust a verification rating for the document, flag the user's account for further review or scrutiny, or the like.

In some implementations, if the document meets the criteria of the additional tests, the document is permitted to be uploaded to the user's account, and if the document does not meet the criteria of the additional tests, the document is rejected and cannot be uploaded to the user's account. In other implementations, the document is uploaded to the user's account regardless of whether the criteria are met, but the verification rating (discussed below) is adjusted or otherwise reflects whether or not (or the degree to which) the criteria are satisfied.

The client device 102-1 then generates at least one verification rating for the document (510) (e.g., with the verification rating module 238). The verification rating, discussed in greater detail below, indicates a degree of confidence that the document is authentic and/or is actually associated with the user. In particular, the accuracy of identity verification is limited by the level of trust that can be placed on the authenticity of the documents. For example, a fraudulent drivers' license or passport cannot be trusted to accurately identify the person who is presenting it. Accordingly, the client device 102-1 performs one or more tests on the document (i.e., the image of the document) to determine its authenticity and whether it actually identifies the user. One specific example of such a test is a comparison between biometric data in a photograph on the document and biometric data in a photograph of the user captured by the client device 102-1, which is performed by the biometric analysis module 234. If it is determined that a face in the photograph from the document matches the recently captured photograph of the user, there is a higher likelihood that the drivers' license is associated with the person in the photograph, and the verification rating will reflect this higher confidence (e.g., with a relatively higher rating). On the other hand, if the faces do not match (or if they match to a lesser degree), then the verification rating will reflect this lower confidence (e.g., with a relatively lower rating).

In some implementations, verification ratings are generated by the client device 102-1 alone. Thus, the documents, which contain sensitive identity information, do not leave the possession of the user. In some implementations, if other devices are used to assist in generating verification ratings (e.g., the server), any information sent to the other devices is encrypted, obfuscated, and/or stripped of any identifying information, so that the user's privacy and the security of the documents is maintained.

In some implementations, the client device 102-1 encrypts the document, the extracted data, and the verification rating (512) (e.g., with the encryption/upload module 240). The client device 102-1 then sends the document, extracted data, and the rating (e.g., one or more encrypted data files) to the server 104 at step (514) (e.g., with the encryption/upload module 240).

In some implementations, the client device 102-1 generates one or more containers (i.e., containers) including any combination of the document, the extracted data, and the verification rating, and sends the container(s) to the server 104 at step (514). In some implementations, containers are collections of individual files (e.g., a zip file). In some implementations, containers are complex data structures that include information from which one or more different files and/or documents (including, for example, an image of a document, data extracted from a document, and the like) can be extracted or constructed, even though the files and/or documents are not represented in the containers as discrete files.

In some implementations, the one or more containers include at least a first file that includes the document and a second file that includes the information extracted from the document. In some implementations, the one or more containers include a third file that includes the at least one verification rating. In some implementations, the at least one verification rating includes a plurality of verification ratings (e.g., including a verification rating for each document in the one or more containers, composite verification ratings, a user score, etc.). (Where the container is a complex data type, the container includes data from which such files and/or information can be extracted/constructed, as discussed above.)

In some implementations, the client device 102-1 performs steps (504)-(514), or a subset thereof, for one or more additional documents. For example, images of multiple documents are captured (504), and, for each document, the client device 102-1 extracts data (506), determines that the identity information matches (508), generates a verification rating (510), encrypts the document, rating, and extracted data (512), and sends these items to the server (514). In some implementations, these multiple documents are combined in the container for sending to the server.

The server 104 receives the document, extracted data, and the rating (516) (e.g., with the information receiving module 342, FIG. 3). In some implementations, these items are received as a container, as described above.

In some implementations, user accounts are assigned a status, which reflects particular information about the account, and determines how the account and/or the information and documents associated with the account can be used. In some implementations, the status of an account reflects whether the account includes a required amount and/or type of documents and user information, or whether the account is deficient in one or more areas. In some implementations, if the account includes the required documents and/or information, its status is "complete," and if the account is deficient in one or more ways, its status is "pending." Other statuses, and other labels for the described statuses, are also assigned to accounts in various implementations.

In some cases, an account is considered "complete" if it includes a government issued photo identification document and a utility bill, as well as a name and address of the user. In other implementations, more or fewer documents or items of information are required in order for an account to be considered complete. The particular documents and/or information that amount to a "complete" account is, in some cases, determined based on regulations, laws, guidelines, or customs of an applicable jurisdiction. In some implementations, the jurisdiction is a jurisdiction of the account holder, a jurisdiction of an institution or entity that is requesting the documents/information, a jurisdiction governing a transaction between an account holder and a requesting institution or entity, or any other appropriate jurisdiction or combination of jurisdictions.

In some cases, an account is considered "pending" if the account lacks particular documents or items of information that are required of a "complete" account. An account can also be assigned a "pending" status based on other conditions. For example, an account can be "pending" if a document or item of information is expired or otherwise out of date. As a specific example, if a passport associated with a user account becomes expired after it is uploaded to the user's account, the account is assigned a "pending" status. As another example, if there is no recent utility bill (e.g., mailed/issued within 90 days of a current date) associated with the account, the account is assigned a "pending" status. Other conditions can also cause an account to be assigned a "pending" status, in various implementations.

In some implementations, only a "complete" account can be used by a user to share documents with other parties. Thus, if a user's account is "pending," the user must provide the missing document(s), information, or perform the required tests (discussed herein) in order to complete the account before the user can authorize other parties to access his or her documents and/or information.

The foregoing discussion describes how users create accounts and upload documents with the client device 102-1. In particular, the client device 102-1, along with one or more modules in the memory 218, performs steps (502) through (514). In some cases, however, other users of the system can create accounts for other users. For example, an institution may decide to use a service provider to access identity verification information for individuals or other entities with whom the bank transacts. Accordingly, the institution may wish to create accounts for some or all individuals for whom it already has identity information, identification documents, and the like. Accordingly, in some implementations, an enterprise device 108-1 includes an account generation module 329 for creating accounts for multiple users. In particular, the enterprise device 108-1 uses the account generation module 329 to perform steps (502-m) through (514-m). Steps (502-m) through (514-m) are analogous to steps (502) through (514), and are performed using modules analogous to those modules of the client device 102-1 that perform those steps on the client device, as described above (e.g., including the data extraction module 330, the document analysis module 332, the verification rating module 334, and the encryption/upload module 336, FIG. 3).

While an institution can create an account for a user, in some implementations, until the account is complete (i.e., contains all the information and/or documents required to establish a complete account), or until the user approves the account and the information and/or documents associated with the account, the account is given a "pending" status. Once the institution and/or the user complete the account (e.g., by providing any missing information and/or documents, and/or by approving information and/or documents uploaded by the institution), the account is given a "complete" status.

In some implementations, accounts created for users by an institution are not uploaded to the service provider (i.e., the server 104) until the user associated with the account has approved and/or completed the account. This way, the server 104 does not need to store and/or manage incomplete and/or pending accounts that will never be completed and/or approved by a user (e.g., because the user does not wish to or has no need to establish the account, or any other appropriate reason). Instead, account information for such accounts is stored in memory associated with the enterprise device 108-1 (e.g., the user information database 346).

Figure 5A:
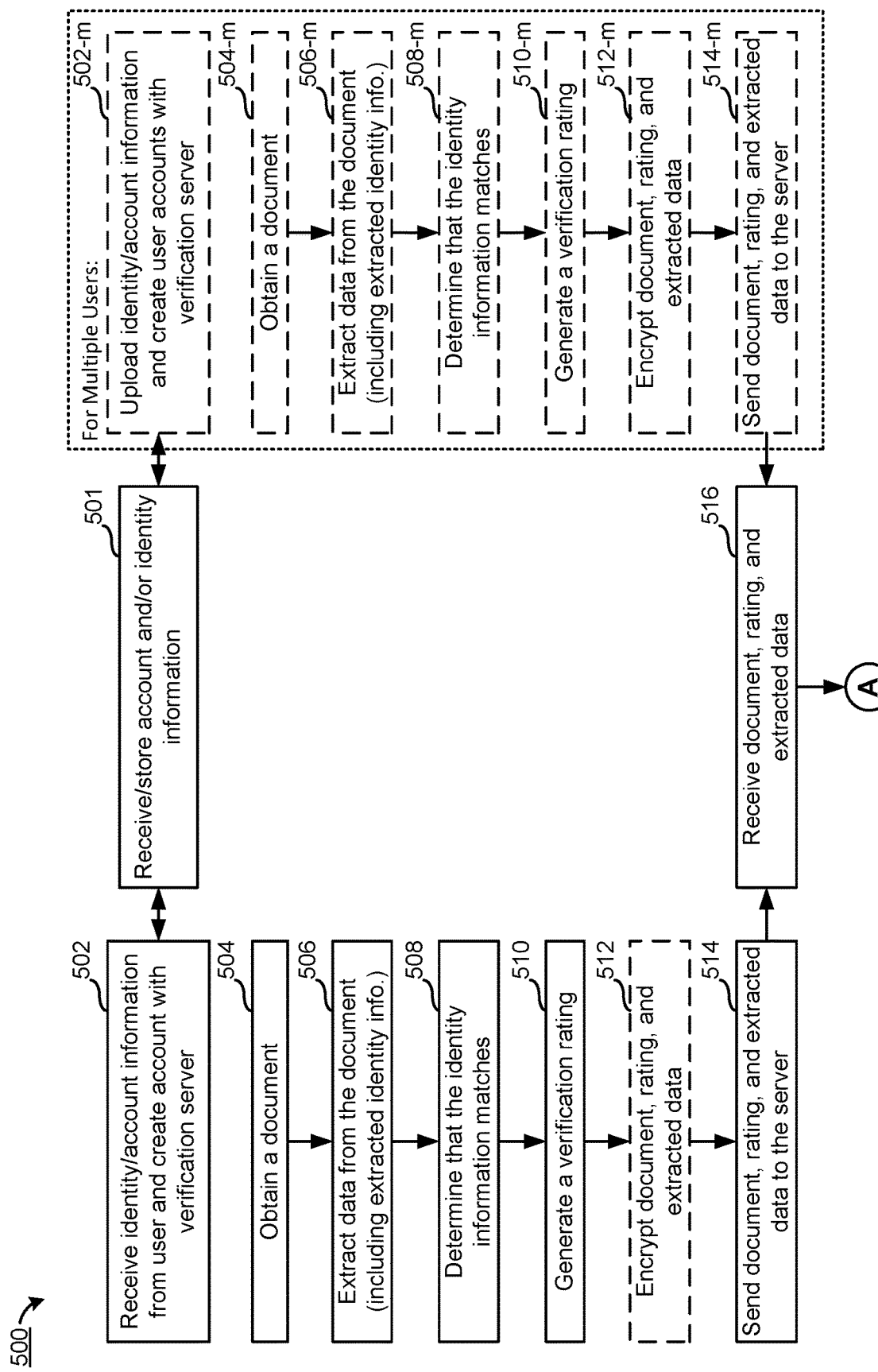
FIGS. 5A-5D are flow diagrams illustrating a method of verifying a user's identity, in accordance with some implementations.
Figure 5B:
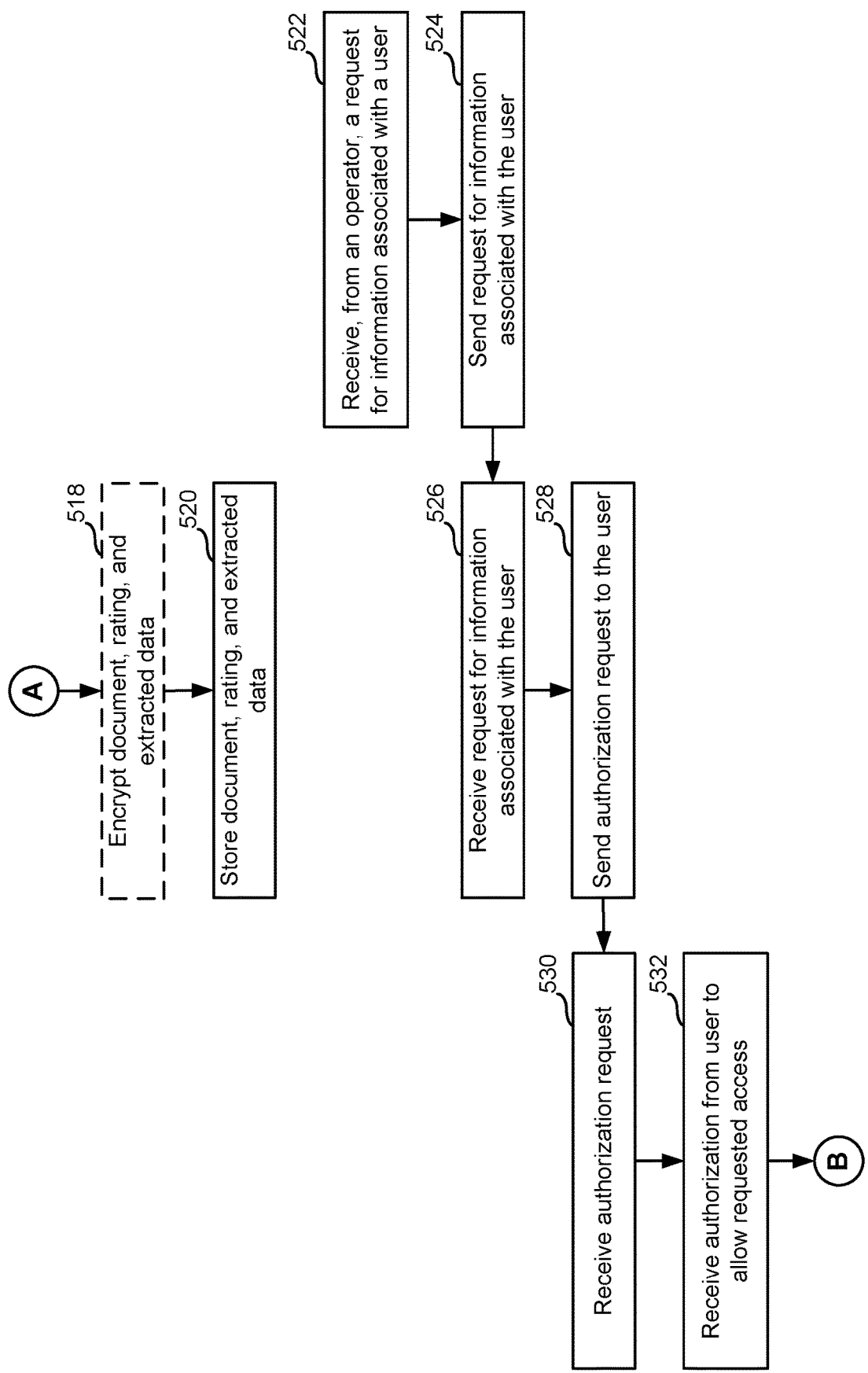

Turning to FIG. 5B, in implementations where the document, verification rating, and extracted data were not encrypted by the client device 102-1 (or the enterprise device 108-1) prior to being sent to the server 104, they are encrypted by the server 104 for storage (518) (e.g., with the encryption module 428).

The server 104 stores the document, extracted data, and the verification rating (520) (e.g., in the user information database 106). In some implementations, where the information is encrypted on the client device 102-1 prior to being sent to the server 104, the server 104 is unable to decrypt the information. Accordingly, users can be assured of the privacy and security of their information, while institutions (and other requesting entities) can be assured that the information has not been tampered with or otherwise altered (or even viewed) by the service provider.

When an institution wishes to access the documentation and/or information necessary in order to verify the identity of an individual, an operator uses the enterprise device 108-1 to request information associated with the individual, and the enterprise device 108-1 receives this request (522) (e.g., with the request handling module 340). In some implementations, the user requests a particular set of documents and information (i.e., distinct information items associated with the user account). For example, a bank may request information such as the user's name, home address, social security number (all of which may be stored by the service provider as part of the user's account information), as well as an image of the user's drivers' license and a recent utility bill and verification ratings for those documents.

In some implementations, the request includes access limits relating to the scope of the access that is to be granted to the requestor, such as a window of time in which the requestor will be permitted to access the information, the number of times that the requestor will be permitted to access the information, etc. In some implementations, the requestor includes such information in its request to the server 104. For example, a bank may request a user's drivers' license and recent utility bill, and specify that it needs to access this information only once. Alternatively, a bank may request this information and specify that it needs to access updated copies of it at any time (and as many times as desired) while the account remains open and/or for a specified length of time (e.g., as specified by a user). Other appropriate access limits or time windows (or any other constraints on access to the information) are envisioned as well.

The enterprise device 108-1 then sends the request for the information to the server 104 at step (524) (e.g., with the request handling module 340).

The server 104 receives the request for information associated with the account of the user (the information including at least one of a document, data extracted from a document, and at least one verification rating) from the enterprise device 108-1 at step (526) (e.g., with the request handling module 430), and sends a request to the client device 102-1 requesting authorization to release the requested information to the requestor (528) (e.g., with the request handling module 430). In some implementations, the client device 102-1 provides a notification or alert indicating that a request has been received or is available to be viewed. In some implementations, the notification or alert is or is included in an email, text message, application alert, or any other appropriate message using any appropriate messaging technique or protocol. In some implementations, the server 104 sends the notification or alert to the client device 102-1 before sending the request to the client device 102-1, and the request is sent to the client device 102-1 once the user logs in to his or her account via the client device 102-1 (e.g., in response to the notification or alert).

The client device 102-1 receives the authorization request (530). The user securely logs onto the client device and can then review the request. The client device 102-1 then prompts the user to partially or fully authorize or deny access to the requested information (e.g., with the request handling module 242). If the client device 102-1 receives authorization from the user to allow access (532), it sends an authorization to the server 104 to release the authorized information to the requestor (534, FIG. 5C) (e.g., with the request handling module 242). In some implementations, the authorization request that is presented to a user identifies particular documents and/or information being requested. Furthermore, in some implementations, the authorization request identifies the access limits (or lack thereof) requested by the requestor. For example, as described above, the request may state that a bank has requested access to the user's drivers' license and a utility bill, and that they want to be able to view (or download an updated copy of) the documents at any time while the user has an account with the bank, or for any other specified time. Thus, the user is able to determine whether or not to allow access according to the request.

In some implementations, the information requested and/or the access limits are non-negotiable. For example, a bank may be required by law to maintain records of certain information of the entities with which it transacts. Accordingly, should the user deny access to that information, the bank will be unable to engage in the subject transaction (e.g., opening a bank account, line of credit, etc.).

On the other hand, in some implementations, the information requested and/or the access limits are negotiable and/or selectable by the user. For example, a bank may request access to more information and/or fewer access limits than are strictly necessary for a particular transaction or relationship. The user can then refuse to authorize the full scope of the request, and instead authorize access to fewer or different documents and/or information, as well as different access limits. In some implementations, the user is informed of any minimum access requirements necessary for a particular transaction so that the user can make an informed decision as to what access limits to allow.

In some implementations, a request includes multiple different authorization request packages, each including a different combination of requested documents, information, and/or access limits, and the user selects which authorization request package to approve. Here too, the user can be informed of the minimum document and access requirements necessary for the requesting entity to be able to engage in a particular transaction.

Figure 5C:
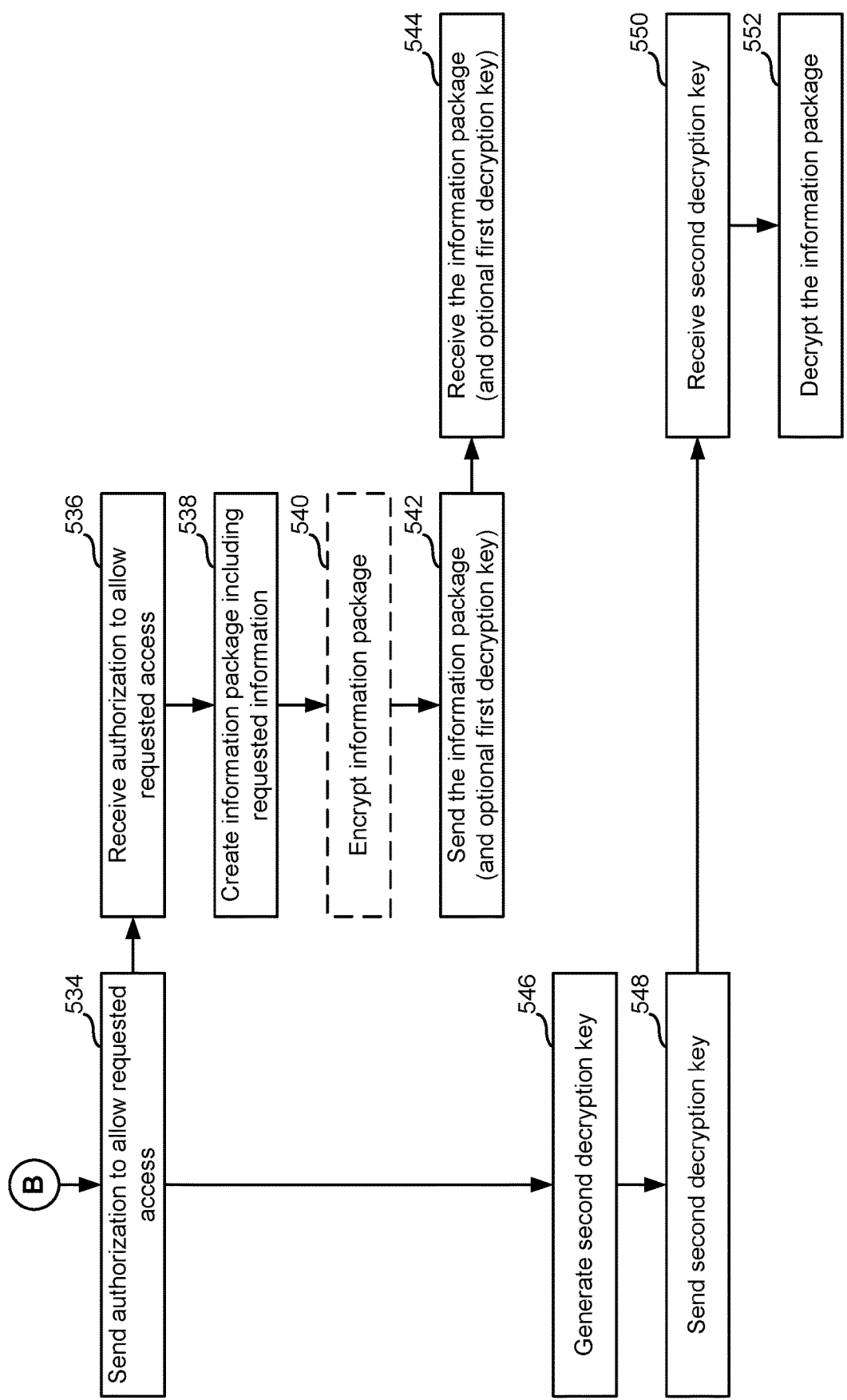

Continuing on FIG. 5C, the server 104 receives the authorization to release the information to the third party (536) (e.g., with the request handling module 430).

The server 104 then creates an information package including the requested information (538) (e.g., with the information packaging/encrypting module 432). For example, the server 104 locates the requested documents, extracted data, verification ratings, etc., and, if necessary, extracts/constructs these items from a container. The information package is any appropriate file, container, composite file, or group of separate files that contain the requested information.

In some implementations, the server 104 encrypts the information package (540) (e.g., with the information packaging/encrypting module 432). In some implementations, the information that constitutes the information package is already encrypted (e.g., having been encrypted by the client device 102-1, the server 104, or the enterprise device 108-1 prior to being stored in the user information database 106). In some implementations, client-based encryption can only be decrypted by a key generated by and/or known to the client device 102-1. Accordingly, in some implementations, the server 104 does not encrypt the information package at this stage.

However, in some implementations, the server 104 encrypts the already-encrypted information again at step (540). This secondary encryption can be used to enable and/or enforce access limits by providing an encryption layer that is controlled by the server 104. For example, as described herein, the enterprise device 108-1 may have to receive authorization from the server 104 each time it wants to view the information that it receives, even if the information is stored locally on the enterprise device 108-1. Accordingly, the enterprise device 108-1 communicates with the server 104 in order to obtain the necessary permissions (and/or decryption keys or codes) before it can access the information.

Returning to FIG. 5C, the server 104 sends the information package to the enterprise device 108-1 (542) (e.g., with the information packaging/encrypting module 432). In some implementations where the server 104 encrypted the information (540), the information package is sent with a first decryption key that is able to decrypt the information package. On the other hand, in some implementations, the first decryption key is not included with the information package even if it was encrypted by the server at (540). In such cases, the enterprise device 108-1 receives the decryption key at a later time, such as when an operator of the enterprise device attempts to access and/or view the information.

The enterprise device 108-1 receives the information package, and the optional first decryption key (544) (e.g., with the information receiving module 342). In some implementations, the enterprise device 108-1 stores the information package in a local database 346, for example, to satisfy record keeping requirements and regulations. Even when the information is stored in a local database, in some implementations, the enterprise device 108-1 cannot view the information without first communicating with the server 104 to determine whether it is permitted to do so, as discussed herein.

As noted above, if the user approves a request for information, the client device 102-1 sends an authorization message to the server 104 (534). In some implementations, if the user approves the request for information (or a subset or superset of the information), it also generates a second decryption key for decrypting the requested information (546) (e.g., with the encryption/upload module 240). In some implementations, the decryption key is generated prior to receiving the authorization request.

In some implementations, the client device 102-1 must generate the decryption key, because it is the only device that can do so. That way, view access to the information remains under the control of the user, and only the user and entities authorized by the user can decrypt and view the information.

The client device 102-1 sends (548) the second decryption key to the enterprise device 108-1 (e.g., with the encryption/upload module 240). The enterprise device 108-1 receives the second decryption key (550) (e.g., with the information receiving module 342).

The enterprise device 108-1 then decrypts the information package (552) (e.g., with the security/decryption module 344). In some implementations, decrypting the information includes first decrypting the information package using the first decryption key (to remove the encryption applied by the server 104), and then decrypting the information contained in the information package with the second decryption key (to remove the encryption applied by the client device 102-1).

Figure 5D:
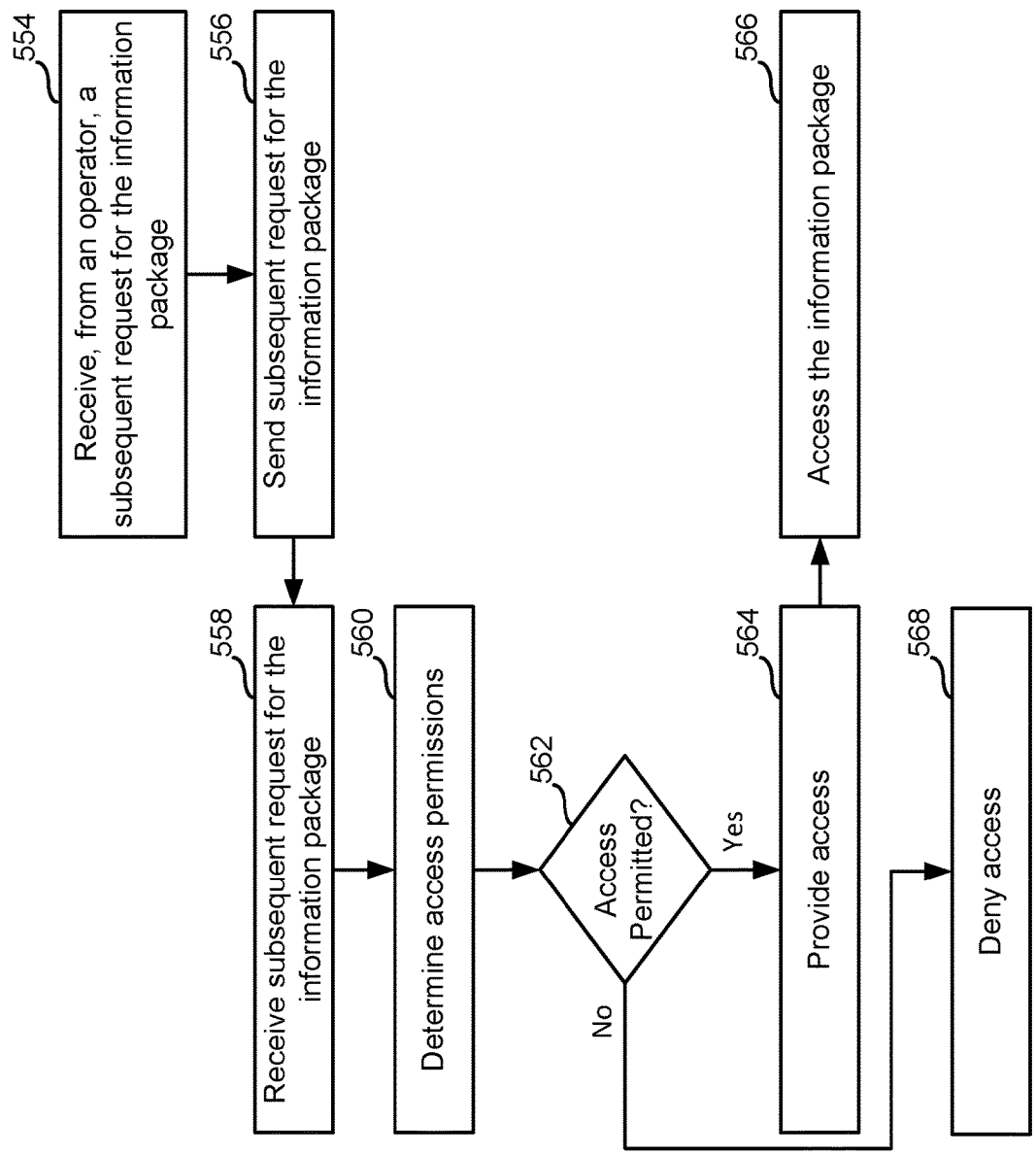

Turning to FIG. 5D, the enterprise device 108-1 receives, from an operator, a subsequent request for the information package (554) (e.g., with the request handling module 338), and sends the subsequent request for the information package to the server 104 (556) (e.g., with the request handling module 338). In some implementations, the subsequent request for the information package is a request for all of the information that was in the original request. In other implementations, the subsequent request includes a request for only a subset of the information in the original request.

Moreover, requests may also specify that the information should include the most up-to-date versions of the requested information. Thus, if the user has uploaded a new drivers' license or utility bill since the information was previously received, the new information will be provided (subject to the access permissions associated with the original request). On the other hand, the request may also specify that the information should include the information as it was at the time of the original request. In some implementations, whether a requesting entity is permitted to access updated versions of documents and information (or whether they are only permitted to access the versions available at the time of the original request) is specified in the access permissions discussed with respect to steps (524)-(532).

The server 104 receives the subsequent request for the information package (558) (e.g., with the request handling module 430), and determines access permissions (560) (e.g., with the access management module 434). For example, the server 104 determines whether the subsequent request is permitted by the original authorization from the user. The access permissions include content permissions (e.g., whether the requestor is permitted to access a particular document, rating, or other information), and/or time/frequency permissions (e.g., whether the request satisfies time window and/or access frequency limits imposed by the user).

If access is permitted (562, Yes), then the server 104 provides access to the requested information (564). In some implementations, providing access (564) includes packaging, encrypting, and sending the requested information to the enterprise device 108-1 as in steps (538)-(544). In some implementations, providing access (564) includes providing a decryption key (or other access token) to enable the enterprise device 108-1 to decrypt or otherwise access information that is already stored by the enterprise device 108-1 (e.g., in the user information database 346). The enterprise device 108-1 then accesses the information package (566).

If access is not permitted (562, No), then the server 104 denies access to the requested information (568) (e.g., with the access management module 434).

As noted above, verification ratings are generated for documents obtained by the client device 102-1 or by the enterprise device 108-1. Verification ratings are based on, derived from, or otherwise reflect the results of one or more tests. Verification ratings, in some implementations, indicate a degree to which a document is authentic and/or actually relates to a particular user. As an example, a document that appears to be a forgery will likely have a lower rating than a document that does not appear to be a forgery. As another example, a document that appears to be expired will likely have a lower rating than one that is still valid. As yet another example, a document that appears to indicate an address that is different than the user's current location will likely have a lower rating than one that has an address falling at or near the user's current location. Because verification ratings can reflect the results of various different tests and/or characteristics, the foregoing descriptions of how test results affect the verification rating are merely exemplary, and are not necessarily dispositive of how any particular verification rating will be affected by the various results. For example, a document that has a high likelihood of being a forgery, but all of the information on the document is otherwise correct (e.g., a name and address on the document match the user's account information, and a photograph on the document is a biometric match to a photograph of the user) may actually have a higher rating than a document that does not appear fraudulent, but includes information that does not match that of the user's account (e.g., the name, address, and biometric information indicates that the document does not relate to the user at all).

In some implementations, each of a plurality of tests performed on or for a document results in a distinct verification rating, and all of the verification ratings for the document are combined to create a composite verification rating for the document. The composite verification rating is generated in any appropriate manner, including using an average (e.g., an arithmetic mean, weighted mean, etc.) of the verification ratings generated by each respective verification test, an algorithm, or any other appropriate combination of verification ratings and/or other information (e.g., summing the results of each test).

Verification ratings for each test employ any appropriate rating or scoring scale. For example, in some implementations, verification ratings use a numeric scale, such as 1-100, 1-10, 1-5, or any other appropriate range (e.g., a letter grade range, such as A-F, A-Z, etc.). Such scales are used for tests that produce a range of results and/or indicate a level or degree of satisfaction of one or more criteria. As one specific example, a test that determines the extent to which a photograph extracted from a document matches a reference photograph of a user can be rated using a scale (e.g., based on the matching algorithm, a rating of 100% indicates a good match, 70% indicates a partial match, 0% indicates a low or zero likelihood of match).

In some implementations, verification ratings are binary or "pass/fail" (which may be indicated in any way, such as with a check mark or green circle for pass, and an "X" or a red circle for fail). In such cases, whether a document is assigned a pass or a fail rating is based on any one or more tests of the document and/or its contents. Specific examples of tests are described herein.

In some implementations, tests result in both a "pass/fail" rating and a numerical rating (e.g., between 1 and 100). In some implementations, whether a test results in a pass or fail rating is based on the numerical rating (e.g., lower than 50 out of 100 results in a fail).

Moreover, in some implementations, composite verification ratings are generated for documents. The composite verification rating is based at least partially on a plurality of verification ratings from a plurality of tests (as described herein). Composite verification ratings are created from any appropriate combination of the verification ratings from individual tests. For example, a composite verification rating can be an average of individual verification ratings, or an additive rating (e.g., each individual rating is based on a 0-10 scale, and the composite rating is the sum of all individual ratings).

In some implementations, a "user score" is generated for a user's account, based at least in part on the verification ratings (and/or composite verification ratings) of the documents associated with a user. In some implementations, the user score is also or instead based on other information, such as the completeness of a user account, third party identity verifications/corroborations, etc.

In some implementations, the user score also reflects the various types of documents that have been provided by a user. For example, if a user provides documents that were not issued by a government (e.g., utility bills, student identification cards, credit cards, etc.), the user score will be lower than if the user has provided government issued documents (e.g., a passport, drivers' license, etc.).

As noted above, various tests can be applied in various implementations to generate verification ratings. Exemplary tests are discussed below. Each test may affect the verification rating in various ways. For example, some tests result in a qualitative analysis of a document, such as a confidence value, a quality value, a rating, or the like. In such cases, verification ratings may be at least partially based on and/or reflect the results of the qualitative analysis. For example, in some implementations, a verification rating is scaled based on the results of the qualitative analysis, such that a lower result reduces the verification rating for a document, and a higher result increases (or does not affect) the verification rating.

Some tests result in a quantitative and/or discrete result, such as whether or not a match is determined, whether or not an expected result is found, or the like. Similarly, in some cases, qualitative analysis results are compared against threshold conditions, resulting in a discrete result (e.g., the threshold condition is either satisfied or it is not). In some implementations, discrete results reduce and/or increase a verification rating, depending on the result (e.g., a failed test reduces a verification rating by a predetermined amount). In some implementations, discrete results act as a threshold for acceptance of the document. For example, if a document does not satisfy a particular threshold (e.g., an expected watermark is absent), the document is rejected and no verification rating is provided for the document (e.g., because it is likely that the document is fraudulent).

The tests described herein can be combined in any appropriate way. For example, in some implementations, some tests are used to generate a numerical verification rating, while others are used to determine whether to accept or reject a document (e.g., pass/fail conditions). Moreover, verification ratings for documents are sometimes described as being "based on" the results of one or more of the following tests. As used herein "based on" means either "exclusively based on" (i.e., based only on), or "at least partially based on."

Figure 5E:
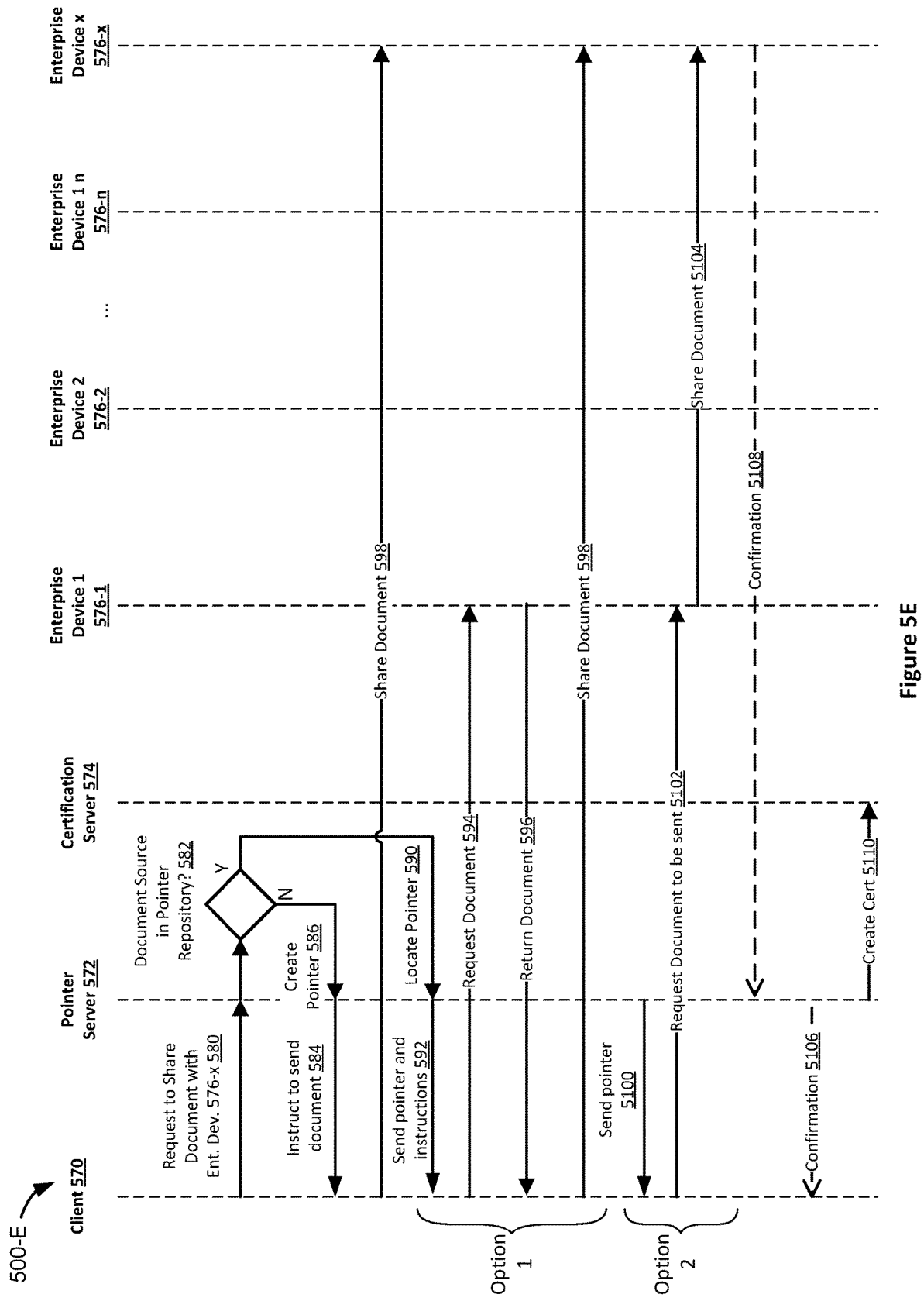
FIGS. 5E-5H are flow diagrams illustrating a method of sharing a document at the request of a user, in accordance with some implementations.

FIG. 5E illustrates a method 570-E for sharing verified identity documents in which a pointer server 572 stores pointers to documents stored at one or more enterprise devices 576-n but does not store, view, read, scan, or otherwise access the documents or information stored within. The documents are stored at one or more enterprise devices 576-n (in, e.g., user information database 116). In some embodiments, the client 570 in FIG. 5E is the client device 102-1 to 102-n of FIGS. 1 and 2; the pointer server 572 is the server device 104 of FIGS. 1 and 4; the certificate server 574 is the same or a different server device 104 of FIGS. 1 and 4; and the enterprise devices 576-n and 576-x are one or more enterprise devices 108-1 of FIGS. 1 and 3.

In some embodiments, the pointer server 572 receives (580) a request from a client device 570 to share a document with an enterprise device 576-x. In some embodiments, the request includes or is accompanied by user-authentication information, such as a username and password; the pointer server authenticates the user by matching the user-authentication information with the user-account information 438 without, in some embodiments, storing or maintaining further information relating to the user such as name, social-security number, etc. For example, Enterprise X asks the user for a current copy of the user's passport. The user, using her client device, then transmits a request to the pointer server 572 to share the document. The pointer server 572 determines (582) if the document has a pointer (e.g., 440 of FIG. 4) in the user information database (e.g., 106 of FIGS. 1 and 4). For example, the pointer server searches for and locates a unique identifier for the document and a network location where the most recent copy of the document is stored. In some embodiments, as described in greater detail below, multiple versions of the document may be stored in multiple places and multiple pointers are located and one or more pointers are selected.

If a pointer is not found in the pointer database (582—No), the pointer server 572 instructs (584) the client to send the document to the enterprise device 576-x and creates (586) a new pointer to the document. The client 570 provides the document (e.g., an electronic copy of the document that is scanned, a photograph is taken, an image is provided, a link to an electronic file is provided, etc.), which it sends 584 to the enterprise device 576-x.

If a pointer is found in the pointer database (582—Yes), the pointer server locates (590) the pointer, and sends (592) the client 570 the pointer and instructions to send the document to the enterprise device x associated with the pointer. In some embodiments, the instructions include a network location of the enterprise device x. The network location may include a network address (such as an IPv4 or IPv6 address and/or port number) of one or more other enterprise devices 576-n that store the document in user information databases 116. The pointer may further include a database address, identifier, or tuple, local address, XML data, or other such information to allow the other enterprise device 576-n to locate the document in its user-information database 116; the present invention is not limited to any type of pointer information. The pointer module 246 (FIG. 2) on the client device receives the instructions to send the document to the enterprise device 576-x.

In some embodiments (Option 1), the user then requests (594) the document from the device associated with the instructions, and downloads (596) the document from the enterprise device 576-n. The client device 570 then transmits or shares (598) the document to (or with) the enterprise device 576-x (i.e., the enterprise that the user originally wanted to share the document with).

In other embodiments (Option 2), the pointer server 572 sends (5100) the client 570 the pointer 572 and the client 570 sends (5102) a request directly to the enterprise device that has the document (e.g., associated with the pointer, here, enterprise device 1 576-1), instructing that device to send the document to the enterprise device 576-x. The enterprise device 576-1 that has the document then transmits (5104) the document to the enterprise device 576-x.

In still other embodiments, not shown, the pointer server 572 accesses or downloads the document associated with the pointer from one or more enterprise devices 576-n and transmits the document to the requesting enterprise device 576-x.

In still other embodiments, not shown, the pointer server 572 instructs the client 570 or the one or more enterprise devices 576-n to transmit the documents directly to the requesting enterprise device 576-x to facilitate the sharing of the documents.

In still other embodiments, not shown, the client 570 authorizes the pointer server 572 to instruct the one or more enterprise devices 576-*n* to transmit the documents directly to the requesting enterprise device 576-*x* to facilitate the sharing of the documents.

In some embodiments, the pointer server 572 finds a plurality of pointers in the pointer database that point to a plurality of copies of the document stored on one or more enterprise devices 576-*n*. In these embodiments, the pointer server 572 selects one pointer in the plurality of pointers based on any of a number of factors or combinations thereof, such as a physical or network proximity of the enterprise device 576-*n* to either or both of the client device 570 or enterprise device 576-*x*, network congestion or traffic between the enterprise device 576-*n* to either or both of the client device 570 or enterprise device 576-*x*, a modification date or time of the copies of the documents, and/or a verification rating of the copies of the documents, and sends the pointer to the selected document to the client device 570 as described above. In other embodiments, the enterprise device 572 sends all of the found pointers or a subset of the found pointers selected using some or all of the factors described above. For example, a pointer to a document having higher verification rating may be selected in lieu of a pointer to a document having a more recent modification date or time if the verification rating of the newer document is lower than a threshold. In other examples, an older document is selected in lieu of a more recent document if the enterprise device 576-*x* requires a document having a modification date or time window in which the older document lies but the more recent document does not.

In some embodiments, the pointer server 572 receives (580) a request from a client device 570 to share a type or class of document with an enterprise device 576-*x*; the type or class of document may include a plurality of documents. For example, the user of the client device 570 may wish to share his or her utility bills with the enterprise device 576-*x*, and the user may have any number of utility bills from different months, quarters, addresses, or locations. In these embodiments, the pointer server 572 searches the pointer database for pointers to the type or class of document or for the documents. The documents are stored on one or more enterprise devices 576-*n* by class or type or by document. The pointer server 572 returns pointers to the documents or one or more pointers to the type or class of documents to the client device 570 as described above.

In some embodiments, the client device 570, pointer server 572, and/or enterprise device 576-*n* sends (5106) a confirmation to the client device 570 that the document has been shared. In some embodiments, the pointer server 572 first waits for a confirmation of receipt (5108) of the document from the enterprise device x before sending the confirmation to the client 570.

In some embodiments, the pointer server creates (5110) a new certificate documenting part of the transaction (at any point in time while processing the transaction) or the entire transaction (after the transaction is completed). In some embodiments, the certificate includes a record for each transaction, such that should sharing of a document fail halfway through the process, the certificate will include all of the communications leading up to the failure. In some embodiments, a certification server 574 creates the certificate. The certificate may include the identity of the user, the names or other identifying information related to the sending and receiving enterprise devices 576-*n* and 576-*x*, the time and date of receipt of the request and/or transmission of the document, and/or the status (success or failure) of the transaction. In some embodiments, a single certificate is created per document share transaction. In these embodiments, multiple certificates per document may be stored on the certification server 574. In other embodiments, each document has a single certificate that is created the first time that a document is uploaded or shared. Here, each time a new share transaction occurs, the single certificate is updated to include any new communications, transactions or other data, which is appended to the existing certificate. The method for updating the certificate or linking or appending new transactions to the certificate can use any underlying linking technology, including Block-Chain technology. The certificate can also include the user score and/or a document score.

Figure 5F:
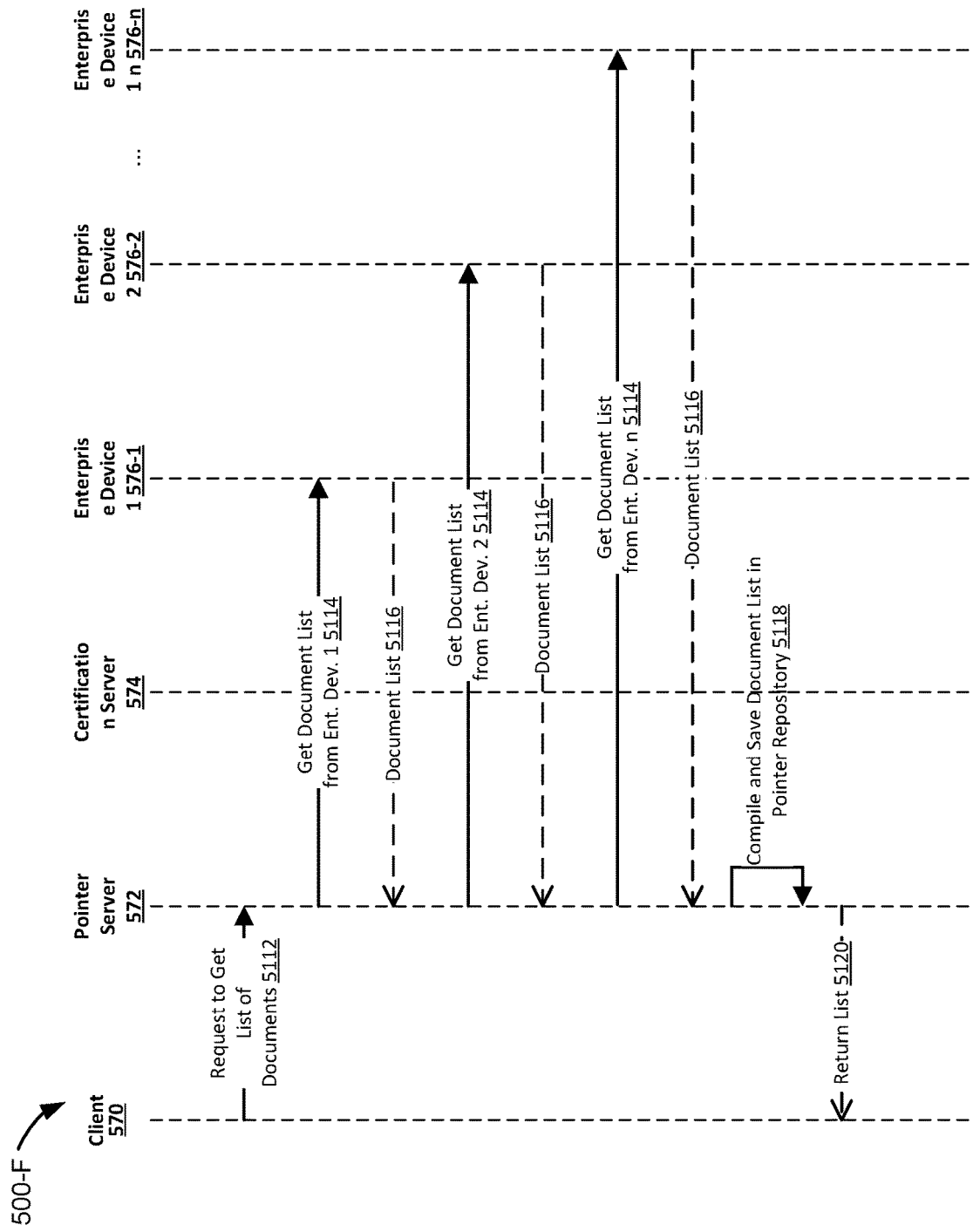

FIG. 5F illustrates a method 570-F for creating or updating a list of documents associated with a user of a client device 570. The pointer server 572 receives (5112) a request from the client device 570 for a list of some or all document associated with the user. The pointer server 572 sends (5114) a request to some or all of the enterprise devices 576-*n* associated with the user for a list of all or some documents associated with the user that are stored on each enterprise device 576-*n*. In response, each enterprise device 576-*n* returns (5116) a list of pointer to the documents to the pointer server 572. In some embodiments, the pointer server 572 compiles (5118) each response into a single list of pointers to documents associated with the user and, in some embodiments, stores the compiled list in the user information database 106 as a new compiled list or by adding it to an existing compiled list associated with the user. The pointer server 572 transmits (5120) the compiled list to the client 570.

Figure 5G:
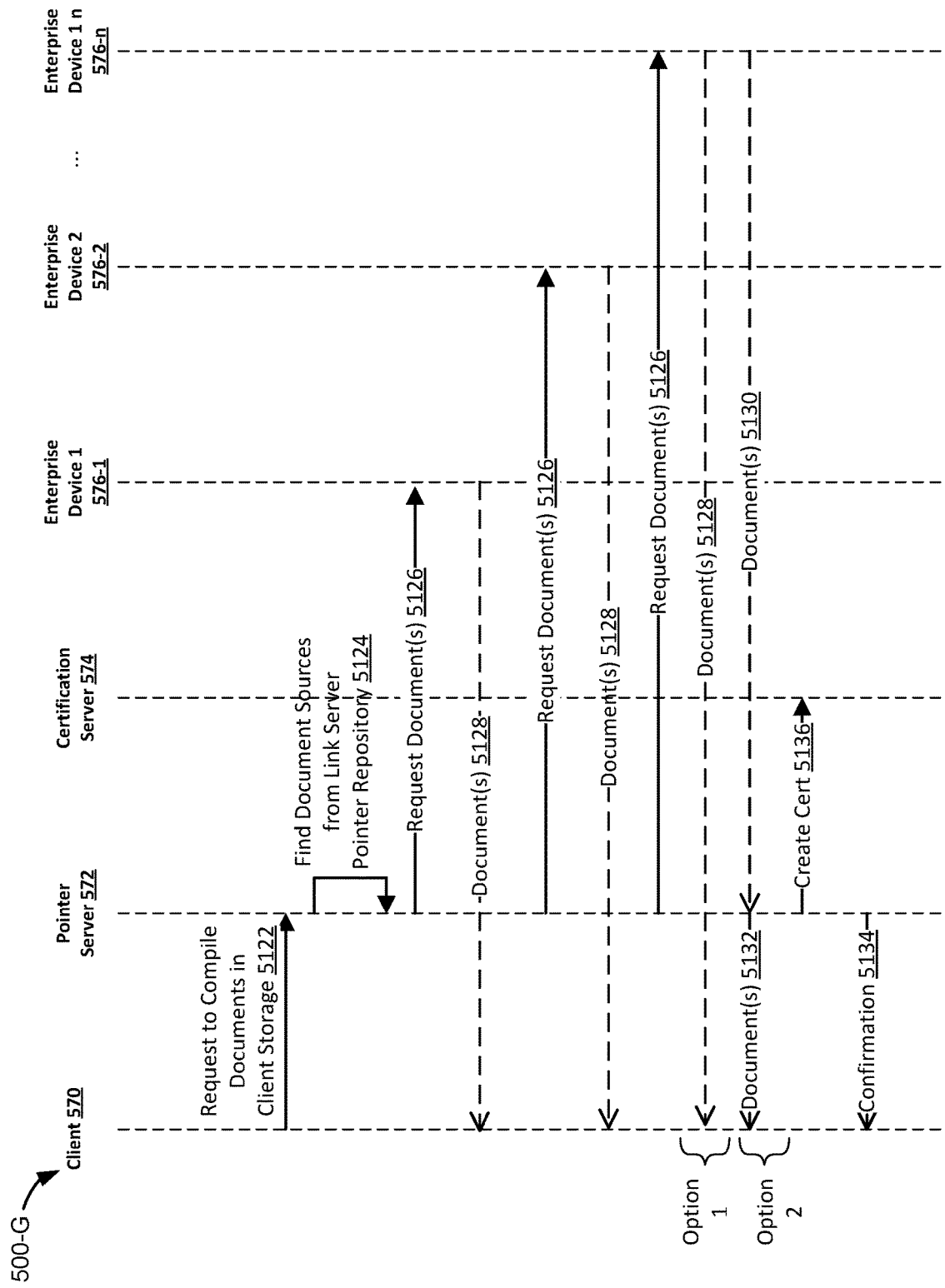

FIG. 5G illustrates a method 570-G for compiling documents associated with a user of a client device in the storage of the client device. For example, the user may have lost, reformatted, or obtained a new client device and requires all of his or her documents to be recompiled on the client. This only applies to users that want all of the documents stored on their client device. The pointer server 572 receives (5122) a request from the client device 570 to compile the documents. The pointer server 572 searches (5124) a pointer database or repository for all pointers to documents associated with the user (e.g., the user's unique identifier). The pointer server 572 then transmits (5126) document requests to the enterprise devices 576-*n* associated with the pointers. In yet other embodiments, not shown, the pointers are returned to the client, which itself requests (5126) the documents.

In some embodiments, the enterprise devices 576-*n* transmit (5128) the documents to the client device 570 in response. In other embodiments, the enterprise devices 576-*n* transmit (5130) the documents to the pointer server 572, which in turn transmits (5132) the documents to the client device 570. In some embodiments, the pointer server 572 transmits (5134) a confirmation to the client 570 and/or transmits (5136) a request to the certification server 574 to create a certificate associated with the request.

Figure 5H:
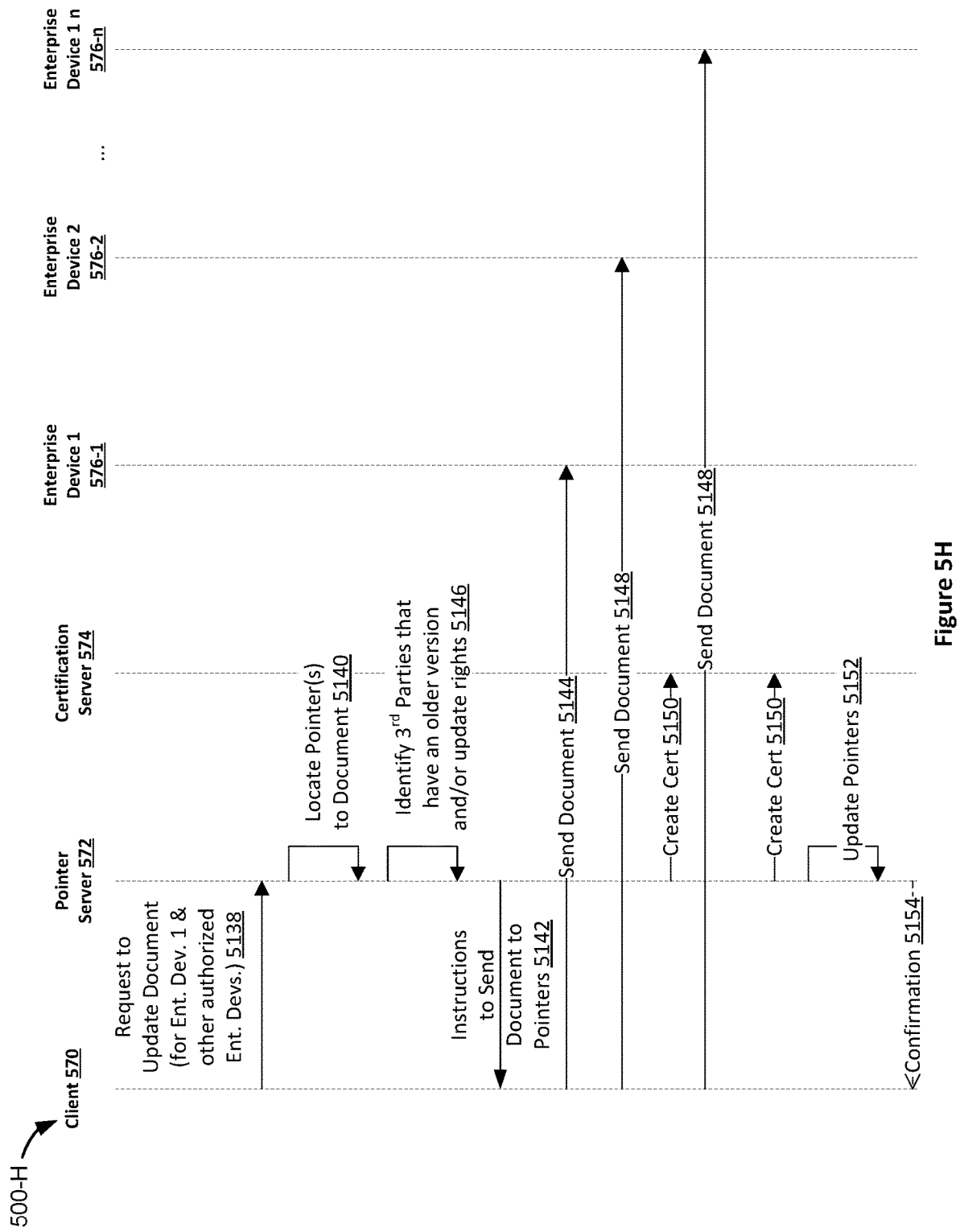

FIG. 5H illustrates a method 570-H for updating documents stored on enterprise devices 576-*n*. The pointer server 572 receives (5138) a request from a client device 570 to update a document stored at an enterprise device 576-1, or, alternatively, simply receives a notification that the client device 570 has a new version of a document. The pointer server 572 then searches (5140) the pointer database for pointers to the document. For example, a user may receive a new driver's license and capture an electronic representation thereof using the methods and systems described herein.

The request 5110 may also or instead come from an enterprise device 576-*n* and/or be initiated by the pointer server 572 itself. For example, the enterprise device and or the pointer server may monitor for an expiration of a document, and near to the date of expiration request that the user provide an updated document. If an earlier version of the document (and/or a pointer to the earlier version of the document) does not exist in the system, then the pointer server proceeds per steps 586-N t, 584, 586, and 598 of FIG. 5E.

In some embodiments, the updated version of the document is stored on the client 570 and the pointer server 572 sends (5142) the corresponding pointer and instructions to send the document to the enterprise devices associated with the pointers to the client 570. The client 570 then transmits (5144) the updated document to the enterprise device(s) (here, 576-1). In other embodiments, not shown, the updated version of the document is stored on another enterprise device 576-*n*, and the pointer server 572 transmits the pointer and instructions to that other device. The other enterprise device 576-*n* then transmits the updated document to the enterprise device 576-1. In still other embodiments, the user of the client device 570 updates the document directly at the enterprise device 576-1; no initial transmission of the updated document thus occurs, and the 576-1 simply informs the pointer server 572 of the update. In other embodiments, the client device 570 transmits the updated version of the electronic document to the pointer server 572, which in turn transmits the updated version of the document to the enterprise device 576-1.

Where other enterprise devices 576-*n* already store the older, non-updated version of the document, the pointer server 572 searches (5146) the pointer database for such enterprise devices 576-*n*, and determines if such other devices have update rights (i.e., the right to receive updated versions of the documents that they already have stored). In other words, in some embodiments, the other enterprise devices 576-*n* receive the updated version of the document only if the user has granted update rights thereto. If they do have earlier versions, and they have update rights, then the pointer server 572 transmits (5148) a request to the client 570 and/or enterprise device 576-1 to transmit the document to the other devices. In some embodiments, the pointer server 572 transmits (5150) a request to the certification server 574 to create a certificate for the request and/or each update. In some embodiments, the pointer server 572 updates (5152) the pointers in the pointer database with any new documents or pointers and sends a confirmation (5154) to the client device 570.

In some implementations, the repository device is the client device or one of the plurality of third-party devices. The client device includes a client processor and client memory storing one or more client programs comprising client computer instructions for execution by the client processor. The document is stored in the client memory and the client computer instructions include transmitting the document to the recipient third-party device upon receipt of the pointer. The document is downloaded to the client memory from the repository device. The client computer instructions include instructions to facilitate transmitting the document from the repository device to the recipient third-party device.

In some implementations, the network communications interface is further configured to transmit a confirmation message to the client device upon successful transmission of the document to the third party device. The computer instructions include the step of creating a certificate associated with the document or include the steps of receiving a request, from the client device, for a list of documents associated with the client device, transmitting at least one request to at least one repository device for its list of documents, receiving the repository-device list of documents from the repository device, and transmitting the repository-device list of documents from the repository device to the client device. The instructions further include the steps of transmitting a plurality of requests to the plurality of repository devices, receiving a plurality of repository-device lists of documents from the plurality of repository devices, compiling the repository-device lists of documents into a single list, and transmitting the compiled list of documents to the client device. The plurality of repository devices includes all repository devices accessible by the system.

In some implementations, the computer instructions comprise the steps of receiving a request, from the client device, to store a document associated with the user in a storage device of the client device, searching in the pointer database for a pointer associated with the document, and transmitting a request to a repository device associated with the pointer to send the document to the client device. The request includes a request to store a plurality of documents associated with the user in the storage device or a request to store all documents associated with the user in the storage device. The network communications interface is further configured to receive a request, from the client device, to update an old version of a document associated with the user stored on the repository device with a new version of the document and to transmit, to the client device, a pointer associated with the old version of the document and a request to send the new version of the document to a repository device associated with the pointer, the instructions further include the steps of searching in the pointer database for the pointer associated with the old version of the document or the step of identifying at least one additional repository device that stores the old version of the document; the network communications interface is further configured to transmit, to the client device, a request to send the new version of the document to at least one additional repository device.

In some implementations, the network communications interface is further configured to receive a request, from the client device, to update an old version of a document associated with the user stored on the repository device with a new version of the document and transmit, to a second repository device, a pointer associated with the old version of the document and a request to send the document to the repository device associated with the pointer; the instructions further include the step of searching in the pointer database for the pointer associated with the old version of the document or the step of identifying at least one additional repository device that stores the old version of the document; the network communications interface is further configured to transmit, to the second repository device, a request to send the new version of the document to the at least one additional repository device.

Address Confirmation

In some implementations, residency and/or address information extracted from documents is compared against location information of the user. In particular, in order to confirm that a user actually resides at the address shown on a document, the address from the document is compared against the current location of the user's device (e.g., as determined by GPS, cell-tower triangulation, IP address geolocation, or the like). In such cases, the verification rating of the document is based at least partially on whether or the degree to which the address matches the current location of the user's device.

Different levels of precision can be used for address confirmation, depending on the particular application or use case. For example, in some cases, it is desired to determine the country of residence of a user. Accordingly, it is not necessary that the user's address exactly match the user's current location. Rather, it is enough that the user's current location is anywhere within the country identified by the user's address. In other cases, it is desired to determine that the user actually lives at the location identified by the user's address. In such cases, it is necessary to determine that the user's current location is within a predetermined distance of the user's address, such that it is likely that the user actually lives at that address. For example, in some implementations, a user's current location is determined to match a purported address if the current location is within 100 feet of a location associated with the user's address (e.g., latitude and longitude values associated with the address). Other distances are also contemplated (e.g., 500 feet, 1000 feet, 1 mile, 5 miles, 10 miles, or any other appropriate distance).

In addition to comparing the user's actual location with the location from a given document, in some implementations, a user score is based on the consistency of the addresses of multiple of a user's documents. In particular, if all of the user's documents are associated with a same location (e.g., a same address, city, state, region, country, etc.), the user score will be higher. Moreover, in some implementations, verification ratings of individual documents reflect whether the address of that document matches addresses of other documents. For example, if a user's passport and drivers' license specify one address, and a user's utility bill specify a different address, then the verification rating for the utility bill (and/or the passport or drivers' license) will reflect the discrepancy (e.g., by lowering the rating for that document or rejecting that document altogether). The client device 102-1 also, in some implementations, looks up an address associated with the user in a separate database in order to compare to an address on one or more documents and/or a current location of the client device 102-1. For example, the client device 102-1 retrieves an address for a user from a credit score database, from online address resources (e.g., yellow or white pages), from a social media portal, etc.

FIG. 6 is a flow diagram illustrating a method 600 for sharing a document at the request of a user, in accordance with some implementations. Each of the operations shown in FIG. 6 may correspond to instructions stored in a computer memory or computer readable storage medium. In some implementations, the steps are performed at an electronic device with one or more processors (or cores) and memory storing one or more programs for execution by the one or more processors (or cores). For example, in some implementations, the steps are performed at any one (or any combination) of the client device 102-1, the server 104, and the enterprise device 108-1. Moreover, the individual steps of the method may be distributed among the multiple electronic devices in any appropriate manner.

A pointer server (502) receives a request (602) from a client device (500) to share a document with a third party (e.g., an enterprise device 506-*x*). Additional details related to obtaining documents are discussed above with respect to step (504) of FIG. 5A.

The pointer server (502) searches a pointer database (604) for a pointer for a network location of the document. If the pointer is not found, in some embodiments, the pointer server (502) creates the pointer.

The pointer server (502) transmits the pointer (606) to the requestor. In some embodiments, the requestor is an enterprise device (506-*n*), and the pointer is received by a pointer module (345) thereon. The enterprise device (506-*x*) accesses or downloads the document pointed to by the pointer; in some embodiments, the document is stored on the client device (500) and/or another enterprise device (506-*n*).

The pointer server (502) sends a confirmation (608) to the client device (500) upon successful download or access of the document by the enterprise device (506-*x*). In some embodiments, the pointer server (502) sends a request to a certificate server (504) to create (610) a certificate related to the sharing of the document.

Photograph Comparison

Documents that include photographs (e.g., drivers' licenses, passports, government issued photo identification cards, etc.) are analyzed to determine whether the photograph in the document matches a photograph of the user. In some implementations, a user provides one or more reference photographs of him or herself. The reference photographs can be captured by an imaging device associated with a client device (e.g., a smartphone camera, a webcam or a scanner coupled to a computer, etc.), or uploaded to the client device (e.g., received as a digital image file in some other way). In some implementations, references photographs are captured from different angles, with different facial expressions, and with different lighting, in order to increase the quality of the photographic analysis.

The photograph from the document is then compared to the reference photograph(s) to determine if they substantially match. The comparison uses facial recognition techniques, such as comparing, between the photograph from the document and the reference photograph biometric information such as: the structure, shape, and proportions of the face; the absolute and/or relative location of the nose and eyes; the distance between the eyes, nose, mouth, and jaw; the upper outlines of the eye sockets; the sides of the mouth; and the area surrounding the cheek bone. Biometric information is extracted from the document photograph and the reference photograph.

In some implementations, the user captures a photograph that includes both their face and the document that contains a photograph. The user's face is then compared to the photograph in the document using one or more of the above techniques (or a technique not listed) to determine whether the photograph matches the user, and the verification rating is based at least in part on a degree of match between the biometric information from the photograph of the user and the biometric information from the reference photograph In some implementations, a confidence value that the individuals in both photographs are the same is calculated based on one or more photographic analysis techniques, including but not limited to those listed above. In some implementations, the confidence value is reflected in a verification rating for a document that contains the photograph.

In some implementations, multiple reference photographs of a user are captured. For example, a client may be asked to capture photographs of themselves from different angles, under different lighting conditions, with or without glasses or other obstructions, with different facial expressions, or the like. In some implementations, a device walks a user through the process of obtaining a certain set of photographs, for example, using visual and/or audio prompts (e.g., showing images or graphics of exemplary photographs, etc.).

In some implementations, in order to facilitate comparison between photographs, a device includes components and/or application modules for performing imaging techniques, such as image rectification, creation/calculation of depth maps, calculation of reflectivity, and the like.

Security Feature Analysis

Some documents include security features such as watermarks, holograms, ghost photos/images, optically variable inks, and/or pigments that are sensitive to and/or reflect certain types of illumination and/or radiation. For example, many government issued photo identification documents (e.g., drivers' licenses, passports, etc.) include such security features. In order to detect and/or capture a suitable photograph of these items, the documents need to be exposed to appropriate types of radiation while the photograph is captured. In some implementations, users are prompted to capture one or more photographs of such documents while exposing it to a particular type of radiation or radiation source.

In some implementations, users capture an image of a document while exposing the document to an infrared radiation source (e.g., a remote control for a television, stereo, DVD player, or the like). In some implementations, users capture an image of a document while exposing the document to an ultraviolet radiation source (e.g., ultraviolet daylight bulbs, ultraviolet flashlights, "black lights," etc.).

For documents that include holograms, users capture a series of photographs or a short video while a camera flash is on (e.g., a flash incorporated with a cell-phone camera). In some implementations, the flash is controlled (e.g., by an application module) so that different flash outputs are used for different photographs. Reflectivity values for the hologram across the series of photographs or short video are analyzed to determine that they satisfy a particular condition (e.g., that the difference in reflectivity between given images substantially conforms to an expected value).

Some documents include text and/or images that must be viewed through a polarizing filter in order to be successfully analyzed. In such cases, users capture an image of the document through a polarizing filter, such as polarized sunglasses or a polarized photographic filter.

Some documents include laser perforations. In order to detect such perforations (which are often so small that they cannot be detected when the document is front-lit), the user captures a photograph of the document under back-lit conditions (e.g., held up to a light bulb) so that the laser perforations can be detected. The laser perforations are then analyzed to determine their quality and/or whether they match an expected pattern or content. In some implementations, the expected content of a laser perforation depends on the issuing authority of the document (e.g., the country that issued a passport).

Some security features do not require special radiation and/or illumination for accurate photographic analysis, such as rainbow and/or guilloché printing. In some implementations, a user captures a photograph of a document that includes rainbow and/or guilloché printing, and the printing is analyzed to determine its presence and/or quality. In some implementations, the quality of rainbow and/or guilloché printing is based on the resolution, colors, detail, shape, or size of the printing, or whether it matches an expected pattern and/or content (and/or any other appropriate metric).

In some implementations, verification ratings are based on and/or reflect the quality and/or presence of the security features described above.

Zone Comparison

Some documents include multiple different zones, where one zone includes the same and/or a subset of the information in one or more other zones. For example, passports include a "visual zone" and a "machine-readable zone." The "visual zone" lists certain information, such as the user's name, address, passport number, and the like in a format that is easily readable by a human. The "machine-readable zone" includes information such as the user's name, passport number, date of birth, country, etc., in a format that is easily readable by a machine.

In some implementations, photographs of documents having multiple zones are analyzed to determine whether the information in the various zones match. For example, a user captures a photograph of a document that includes multiple zones. Optical character recognition ("OCR") is then performed (using any suitable OCR technique) on all or a subset of the zones (e.g., the "visual zone" and the "machine-readable zone" of a passport), and the information contained in the zones is compared. In some implementations, verification ratings are based on and/or reflect the degree to which information in each of the multiple zones match.

In some implementations, a "machine-readable zone" includes a bar code or other non-alphanumeric character based content, and, therefore, is not suited to OCR techniques. In such cases, the content of the "machine-readable zone" is analyzed using any appropriate technique, such as decoding a bar code using appropriate code-reading techniques.

Document Presence Tests

Some tests are designed to confirm that the user is in the presence of the actual document in question. For example, a user captures a series of photographs of different pages of a document (e.g., a passport) within a certain time frame. Successfully providing the requested images of the requested pages within the time frame corroborates that the user is in the presence of the actual document.

As another example, a user captures a photograph of the user holding the document in front of a mirror. As yet another example, a user captures a video recording showing the user holding the document. As yet another example, a user captures a photograph of a most recent stamp in a passport. The ability of the user to provide such images/videos corroborates that the user is in the presence of the actual document (e.g., as opposed to a copy of the document or only a single page of the document).

As yet another example, a user is prompted to capture photographs of a document in accordance with certain criteria. Specifically, the user is prompted to capture photographs of a document in certain orientations, positions, angles, and the like. The ability of the user to capture the requested images suggests whether the user is in the presence of the actual document.

In some implementations, a reticle is displayed on a viewfinder of an imaging device (e.g., on a screen of a smartphone or digital camera) that specifies an orientation of the document. The user must then capture an image according to the specified orientation. For example, the reticle is a trapezoid, and the user must orient the document and/or the camera such that the document fits within and/or substantially matches the shape of the reticle. In some implementations, the specific orientations, positions, or angles requested are determined in a pseudo-random manner, so that a user cannot easily predict what photographs will be requested.

In some implementations, a user captures photographs of paper-based documents against a substantially transparent surface (e.g., a glass window). For paper documents, the light illuminating the back surface causes the document to appear translucent, allowing any printing or content on the back of the page to become at least partially visible. Accordingly, the photograph is analyzed to determine the content and/or quality of content on the back surface of the document (i.e., the document surface that is against the transparent surface), and/or to evaluate the level, consistency, or quality of translucence of the paper itself.

Issuing Party Confirmation Tests

Some tests confirm whether a particular document embodies or includes parameters or patterns expected of a document issued by a particular issuing party. For example, passport numbers for a certain country may conform to a detectable pattern. If the parameters or patterns do not match expected ones (e.g., based on the user's self-reported information, or based on other information extracted from the document), then the authenticity of the document may be suspect.

In some implementations, a user captures a photograph of the center pages of a passport, and the threading pattern of the passport binding (visible in the center pages) is compared against a known threading pattern for the purported country or issuing party/jurisdiction of the passport.

In some implementations, a user captures a photograph of a portion of a document that contains a unique identifier (e.g., a passport number, drivers' license number, etc.), and the number is compared against a known pattern for the purported country, state, or issuing party/jurisdiction of the document.

Depth Analysis

Three-dimensional analysis of a document (and/or a document in conjunction with one or more other objects) is also used in some implementations to determine that the document is authentic. For example, in some implementations, a user captures several directional point-of-view photographs of a document. As another example, a user captures one or more photographs of a document with extraneous objects placed over it. Verification ratings for these documents reflect a calculation of depth based on image rectification techniques.

Physical Trait Tests

Some documents are made of materials that have unique properties. For example, drivers' licenses are typically made of a plastic or composite that has a certain rigidity and/or stiffness. Accordingly, some tests are designed to determine whether the document is likely made of an expected material. Specifically, in some implementations, a user captures a photograph in which he or she is bending a document (e.g., a drivers' license). The photograph can be analyzed to determine whether the document conforms to an expected curvature, or otherwise appears to be made of an expected material (e.g., a plastic card rather than a slip of paper).

Information Corroboration Tests

In some implementations, a verification rating for a document is also based on whether or the degree to which information from the document matches information from another source. For example, as noted above, the other source of information can be user-entered information (e.g., information provided by a user during an account enrollment process). In some implementations, the other source of information is another document. For example, a verification rating for a drivers' license is based at least in part on the degree to which the information in the drivers' license matches information extracted from a passport.

As a specific example, certain drivers' licenses are issued with both a plastic card and a paper slip (e.g., drivers' licenses in the United Kingdom and the European Union). In these cases, the verification rating for a drivers' license is based on whether or the degree to which the information on the plastic card matches the information on the paper slip. Moreover, for such two-part documents, the verification rating is also based on whether or not the paper slip can be provided. In some implementations, no verification rating is provided for such document if the second part of the document cannot be photographed.

Signature Comparison

In some implementations, users are required or requested to sign documents before capturing photographs of them. Such signatures are then compared to a reference signature associated with the user. The verification rating is then based on whether or the degree to which the signature matches the reference signature. Reference signatures are, for example, provided by the user during an account enrollment process (e.g., entered by a user via a touchscreen or touchpad input device), or extracted from another document (e.g., drivers' license, passport, etc.). In some implementations, documents that must be signed include utility bills.

In some implementations, a video is captured of a user signing a document. The video is then analyzed to determine whether the user signed the document within an acceptable time frame (e.g., less than 5 seconds, or any other appropriate time frame), and whether the resulting signature sufficiently matches a reference signature. This can help detect fraudulent or forged signatures, as it may be difficult for a user to quickly produce a convincing forgery.

Third Party Review

In some implementations, third parties can verify and/or corroborate information and/or documents of other users. For example, notaries, lawyers, or other authorized individuals can review information submitted by a user and provide an analysis and/or opinion about the documents and/or the user. In some implementations, such analysis and/or opinion is reflected in a verification rating of a document or a user score. In other implementations, it is independent of a verification rating or user score (e.g., it is a separate indication that the account has been verified by a third party). In some implementations, the third party is provided with physical versions of documents for review (e.g., copies or originals are delivered to the third party).

In some implementations, third parties are other users of the service who personally corroborate the identity claims of other users. For example, a first user who personally knows a second user can corroborate the second user's identity, which can increase a verification rating and/or user score of the second user, or appear as a separate indication that the account has been corroborated by another user. In some implementations, the first user's verification rating(s), account status, and/or user score is affected if the users and/or accounts that they corroborate turn out to be falsified, fraudulent, or otherwise suspect. For example, a user score of the corroborating user can be reduced, their account can be degraded to a "pending" status, or their account can be rejected by the service provider altogether.

Also, where corroboration by a first user affects a verification rating or user score of a second user, the verification ratings and/or corroboration history of the first user can affect the amount by which the second user's verification rating or user score is changed. For example, if a user with a high user score (the first user) corroborates the identity of the second user, the second user's score can be increased more than it would be if the first user had a lower user score.

Any of the tests described above can be performed on any appropriate device, depending on the implementation. For example, in some implementations, they are performed on a client device 102-1 (e.g., as part of a document upload process performed by a user). In some implementations, they are performed on an enterprise device 108-1 (e.g., as part of an account generation process performed on behalf of individuals by an institution, using documents already in the possession of the institution). In some implementations, they are performed on a server 104 (e.g., after they have been uploaded by a client device 102-*n* or an enterprise device 108-*n*).

Not all of the tests described above are necessarily applied to all documents. Rather, one of skill in the art will recognize that some tests are not applicable to certain documents or types of documents. For example, a photograph comparison tests (e.g., comparing a photograph from a document to a reference photograph of a user) would not apply to documents that do not include photographs of the user. Similarly, hologram analysis tests would not apply to documents that do not include holograms. In some implementations, the tests that can be performed on a particular document depend on the type of document.

Moreover, not all tests that are suitable for a particular document are necessarily performed on that document. Rather, in some implementations, when a document is uploaded, a certain subset of the suitable tests for that document is selected. The user is then prompted to capture the photographs and/or images required for the selected tests.

In some implementations, when a document is obtained from a user, the subset of tests are selected in a pseudo-random fashion, such that it is difficult for a user to predict what tests will be required for any particular document. Accordingly, it is more difficult for users to create or obtain fraudulent documents (or to capture photographs of someone else's documents) ahead of time if they cannot predict what particular photographs they will be prompted to capture and/or what analysis will be performed on the document.

In some implementations, a user can increase the verification rating for a particular document by electing to perform one or more additional tests. The verification rating is then adjusted based on the results of the additional tests. Specifically, if the results are positive (e.g., support the validity and/or authenticity of the document), the verification rating is increased. On the other hand, if the results are negative (e.g., refute the validity and/or authenticity of the document), the verification rating is decreased.

In some implementations, the number of tests performed on a document is reflected and/or included in the verification rating itself. For example, a document may be amenable to 10 different tests, and the results of each test are scored on a 0-10 scale. Thus, if a document is subjected to 3 tests, and receives a perfect result for each test, the overall verification rating is 30 of a possible 100. Subjecting the document to additional tests can then increase the verification rating, depending on the results of those tests.

On the other hand, in some implementations, the number of tests performed on a document is reflected separately from the verification rating. For example, a verification rating for a document may be a certain value (e.g., 80%) based on the results of a certain number of tests (e.g., 3 of a possible 10), and the number of tests is reported separately from the verification rating. Thus, in this example, the rating of 80% reflects a combined result of the 3 tests that were performed (e.g., an average rating), and does not indicate the number of tests that were performed.

For any of the tests described above, users are prompted with step-by-step instructions, examples, sample images, and/or any other information to assist with the successful completion of the requested tests. Also, any analysis used in any of the tests described above may be fully automatic (without human intervention), fully manual, or a combination of automatic and manual. A facial recognition analysis, for example, can be performed by a computer (e.g., using a facial recognition and/or comparison algorithm), or by a human (e.g., a human operator reviewing a reference photograph and a document photograph and determining whether they match. In some implementations, a human operator reviews the results of an automatic analysis process in order to confirm, reject, and/or modify the results of the analysis.

The methods illustrated in FIGS. 5A-6 may be governed by instructions that are stored in a computer readable storage medium and that are executed by at least one processor of at least one electronic device (e.g., one or more client devices 102-*n*, one or more enterprise devices 108-*n*, or a server 104). Each of the operations shown in FIGS. 5A-6 may correspond to instructions stored in a non-transitory computer memory or computer readable storage medium. In various implementations, the non-transitory computer readable storage medium includes a magnetic or optical disk storage device, solid state storage devices, such as Flash memory, or other non-volatile memory device or devices. The computer readable instructions stored on the non-transitory computer readable storage medium may be in source code, assembly language code, object code, or other instruction format that is interpreted and/or executable by one or more processors (or cores).

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A server system for facilitating the sharing of information, comprising:
   a processor and memory storing one or more programs comprising computer instructions for execution by the processor;
   a pointer database that is communicatively coupled to the processor, wherein a pointer stored by the pointer database includes a unique identifier of information associated with a user and a local storage location of the information on a repository device;
   a network communications interface electronically coupled to the processor and configured to:
      electronically receive, via a computer network, from a client device associated with the user, an electronic authorization to share the information with a recipient third-party device of a plurality of recipient third-party devices remote from the client device;
      in response to receiving the electronic authorization, transmit an information package including the pointer that includes the unique identifier of the information and the local storage location of the information on the repository device to one or more of the client device, the repository, or the third-party device to facilitate the sharing of the information with the recipient third-party device, wherein the information package, including the pointer that includes the unique identifier of the information and the local storage location of the information on the repository device, is encrypted using an encryption key; and
      create a certificate that includes an indication of a status of transmitting the information package, including the pointer, from the server system to the one or more of the client device, the repository, or the third-party device.

2. The system of claim 1, wherein the network communications interface is further configured to, prior to receiving the electronic authorization from the client device:
   receive, via the computer network, a request from the third-party device for the information; and
   transmit, via the computer network, to the client device, an authorization request to share the information with the third-party device.

3. The system of claim 2, wherein communications received and transmitted by the network communications interface are over one or more secure communication channels.

4. The system of claim 1, wherein the plurality of repository devices comprises all repository devices accessible by the server system.

5. The system of claim 1, wherein the repository device is the client device, and comprises a client processor and client memory storing one or more client programs comprising client computer instructions for execution by the client device.

6. The system of claim 5, wherein the information is stored in the client memory and wherein the one or more client computer instructions comprise transmitting the information to the recipient third-party device upon receipt of the pointer.

7. The system of claim 6, further comprising, at the client device, downloading the information to the client memory from the repository device.

8. The system of claim 5, wherein the client computer instructions comprise instructions to facilitate transmitting the information from the repository device to the recipient third-party device.

9. The system of claim 1, wherein the computer instructions comprise instructions for:
   receiving a request, from the client device, for a list of documents associated with the client device;
   transmitting at least one request to one or more of the plurality of repository devices for one or more lists of documents associated with the user;
   receiving the one or more lists of documents from the one or more repository devices; and
   transmitting the one or more lists to the client device.

10. The system of claim 9, wherein the computer instructions further comprise instructions for compiling the one or more lists of documents into a single list before transmitting the single list to the client device.

11. The system of claim 1, wherein the computer instructions comprise instructions for:
   receiving a request, from the client device, to store the information in a storage device of the client device;
   searching in the pointer database for a pointer associated with the information; and transmitting a request to the repository device to send the information to the client device.

12. The system of claim 1, wherein the network communications interface is further configured to receive a request, from the client device, to update an old version of the information associated with the user stored on the repository device with a new version of the information, and to transmit, to the client device, a pointer associated with the old version of the information and a request to send the new version of the information to a repository device associated with the pointer,
wherein the computer instructions further comprise instructions for searching in the pointer database for the pointer associated with the old version of the information.

13. The system of claim 12, wherein the computer instructions further comprise instructions for identifying at least one additional repository device that stores the old version of the information, and wherein the network communications interface is further configured to transmit, to the client repository device, a request to send the new version of the information to the at least one additional repository device.

14. The system of claim 1, wherein the network communications interface is further configured to receive a request, from the client device, to update an old version of the information associated with the user stored on the repository device with a new version of the information, and transmit, to a second repository device, a pointer associated with the old version of the information and a request to send the information to the repository device associated with the pointer, wherein the computer instructions further comprise instructions for searching in the pointer database for the pointer associated with the old version of the information.

15. The system of claim 14, wherein the computer instructions further comprise instructions for identifying at least one additional repository device that stores the old version of the information, and wherein the network communications interface is further configured to transmit, to the second repository device, a request to send the new version of the information to the at least one additional repository device.

16. The system of claim 1, wherein the encryption key is generated by or known to the client device.

17. The system of claim 1, wherein the information package is encrypted at the server system and a decryption key is sent separately from the information package.

18. The system of claim 1, wherein the information package is encrypted at the client device and a decryption key to decrypt the information package is generated by or known to the client device.

19. The system of claim 1, wherein the certificate includes at least one of identifying information for the user and identifying information for the recipient third-party device.

20. The system of claim 19, wherein the certificate includes at least one of a time at which the information is received by the recipient third-party device and a time at which a request for the information is received.

21. The system of claim 1, wherein the certificate includes a user score generated for a user account based at least in part on verification ratings of one or more documents associated with the user.

22. The system of claim 1, wherein, after the certificate is created, the certificate is updated to include information about a new transaction.

23. A non-transitory computer readable storage medium storing one or more programs, the one or more programs comprising instructions, which when executed by a server system with one or more processors and memory storing the one or more programs, cause the server system to:
receive, from a client device associated with a user, an electronic authorization to share a information associated with the user with a recipient third-party device of a plurality of third-party devices remote from the server system;
search a pointer database for a pointer to the information, the pointer comprising a unique identifier for the information and a local storage location of the information on a repository device;
transmit an information package including the pointer that includes the unique identifier of the information and the local storage location of the information on the repository device to one or more of the client device, the repository, or the third party device to facilitate the sharing of the information stored on the repository device with the recipient third-party device, wherein the information package, including the pointer that includes the unique identifier of the information and the local storage location of the information on the repository device, is encrypted using an encryption key; and
create a certificate that includes an indication of a status of transmitting the information package, including the pointer, from the server system to the one or more of the client device, the repository, or the third-party device.

* * * * *